(12) United States Patent
Hassebrook et al.

(10) Patent No.: US 8,509,501 B2
(45) Date of Patent: Aug. 13, 2013

(54) SYSTEM AND METHOD FOR 3D IMAGING USING STRUCTURED LIGHT ILLUMINATION

(71) Applicant: University of Kentucky Research Foundation, Lexington, KY (US)

(72) Inventors: Laurence G. Hassebrook, Lexington, KY (US); Daniel L. Lau, Lexington, KY (US); Henry G. Dietz, Lexington, KY (US)

( * ) Notice: Subject to any disclaimer, the term of this patent is extended or adjusted under 35 U.S.C. 154(b) by 0 days.

(21) Appl. No.: 13/751,985

(22) Filed: Jan. 28, 2013

(65) Prior Publication Data

US 2013/0136318 A1      May 30, 2013

Related U.S. Application Data

(60) Continuation of application No. 13/527,704, filed on Jun. 20, 2012, now Pat. No. 8,363,907, which is a division of application No. 11/586,473, filed on Oct. 25, 2006, now Pat. No. 8,224,064, which is a continuation-in-part of application No. 10/444,033, filed on May 21, 2003, now Pat. No. 7,440,590.

(60) Provisional application No. 60/730,185, filed on Oct. 25, 2005.

(51) Int. Cl.
*G06K 9/00* (2006.01)

(52) U.S. Cl.
USPC ............. 382/125; 345/582; 902/3; 340/5.83; 396/15

(58) Field of Classification Search
USPC ................ 382/100, 106, 108, 115, 124–126, 382/154; 353/34; 720/724; 352/41, 47, 352/67; 359/263, 318; 356/3, 3.01, 3.09, 356/71; 345/582–588; 235/380, 492; 704/246, 704/273; 902/3, 4, 25; 340/5.1, 5.2, 5.82, 340/5.83; 705/1, 26, 42; 707/2, 6, 7; 396/14, 396/15; 283/68
See application file for complete search history.

(56) References Cited

U.S. PATENT DOCUMENTS

| | | | | | |
|---|---|---|---|---|---|
| 5,771,310 | A | * | 6/1998 | Vannah | 382/154 |
| 6,125,197 | A | * | 9/2000 | Mack et al. | 382/154 |
| 6,483,932 | B1 | * | 11/2002 | Martinez et al. | 382/124 |
| 6,643,390 | B1 | * | 11/2003 | Clark et al. | 382/124 |
| 7,013,040 | B2 | * | 3/2006 | Shiratani | 382/154 |
| 7,075,625 | B2 | * | 7/2006 | Abe | 356/3.01 |
| 7,092,563 | B2 | * | 8/2006 | Shiratani | 382/154 |
| 7,116,806 | B2 | * | 10/2006 | Werthiem et al. | 382/124 |
| 7,356,171 | B2 | * | 4/2008 | Werthiem et al. | 382/124 |
| 7,440,590 | B1 | * | 10/2008 | Hassebrook et al. | 382/108 |
| 7,609,865 | B2 | * | 10/2009 | Chen | 382/124 |
| 2006/0120576 | A1 | * | 6/2006 | Chen | 382/124 |

* cited by examiner

*Primary Examiner* — Anand Bhatnagar
(74) *Attorney, Agent, or Firm* — Jessica W. Smith

(57) ABSTRACT

A biometrics system captures and processes a handprint image using a structured light illumination to create a 2D representation equivalent of a rolled inked handprint. A processing unit calculates 3D coordinates of the hand from the plurality of images and maps the 3D coordinates to a 2D flat surface to create a 2D representation equivalent of a rolled inked handprint.

20 Claims, 21 Drawing Sheets

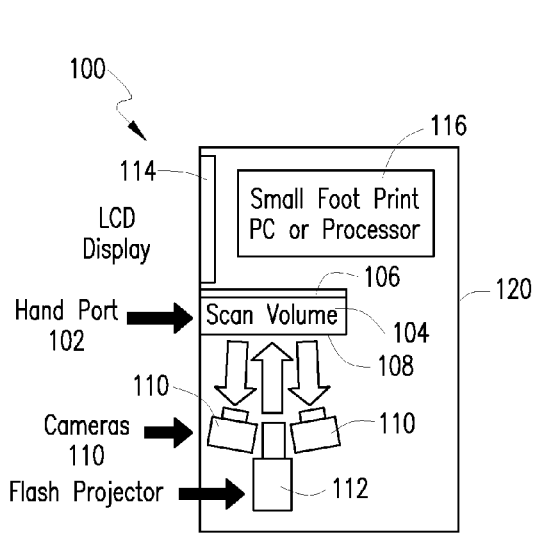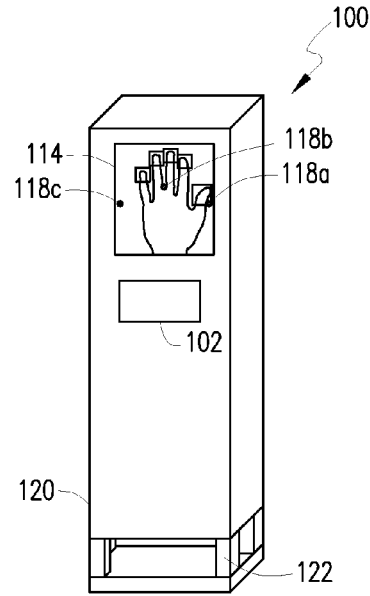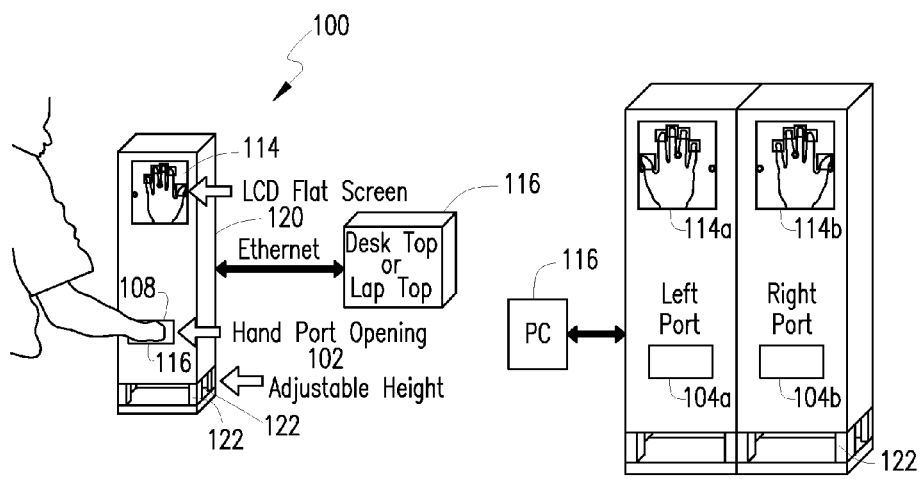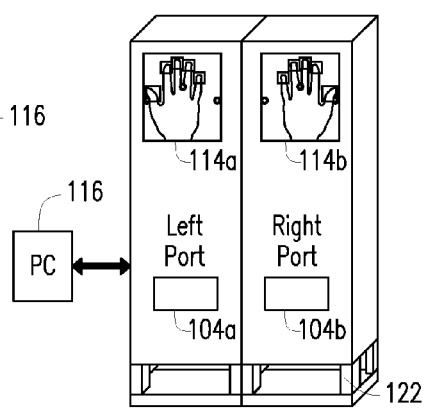
FIG. 2a
FIG. 2b
FIG. 3
FIG. 4

SYSTEM AND METHOD FOR 3D IMAGING USING STRUCTURED LIGHT ILLUMINATION

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility patent application Ser. No. 13/527,704, entitled "System and Method for 3D Imaging using Structured Light Illumination," filed Jun. 20, 2012, pending, which claims priority pursuant to 35 U.S.C. §120, as a divisional application, to the following U.S. Utility Patent Application which is hereby incorporated herein by reference in its entirety and made part of the present U.S. Utility Patent Application for all purposes:

2. U.S. Utility patent application Ser. No. 11/586,473, entitled "System and Method for 3D Imaging using Structured Light Illumination," filed Oct. 25, 2006, now U.S. Pat. No. 8,224,064 issued on Jul. 7, 2012, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Patent Application Ser. No. 60/730,185, filed Oct. 25, 2005.

U.S. Utility patent application Ser. No. 11/586,473 also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

1. U.S. Utility patent application Ser. No. 10/444,033, entitled "System and Technique for Retrieving Depth Information about a Surface by Projecting a Composite Image of Modulated Light Patterns," filed May 21, 2003, now U.S. Pat. No. 7,440,590 issued on Oct. 21, 2008.

STATEMENT REGARDING FEDERALLY SPONSORED RESEARCH OR DEVELOPMENT

The U.S. Government has a paid up license in this invention and the right in limited circumstances to require the patent owner to license others on reasonable terms as provided for by the terms of Contract No. 2004-IJ-CX-K055 awarded by the National Institute of Justice, through subcontract with Eastern Kentucky University Contract: 06-202.

BACKGROUND OF THE INVENTION

1. Technical Field of the Invention

This invention relates to biometrics, and in particular to three dimensional (3D) imaging using structured light illumination for biometrics.

2. Description of Related Art

Biometrics is the science of measuring and analyzing biological data. In law enforcement and security fields, biometrics is used to measure and analyze human features, such as fingerprints, facial patterns, hand measurements, retinas, etc. Well known biometric measurements are fingerprints and palm prints. Fingerprints and palm prints are now and, for the foreseeable future the most relied upon biometric measurements for verifying a person's identity and also for linking persons to a criminal history and background checks. Criminal justice agencies rely on fingerprints and palm prints for positive identification to latent prints collected as evidence at crime scenes and in processing persons through the criminal justice system.

The National Institute of Science and Technology (NIST) and the American National Standards Institute (ANSI) supports the ANSI/NIST-ITL 1-2000 Data Format for the Interchange of Fingerprint, Facial, & Scar Mark & Tattoo (SMT) Information. This standard defines the content, format, and units of measurement for the exchange of fingerprint, palm print, facial/mug shot, and scar, mark, & tattoo (SMT) image information that may be used in the identification process of a subject. The information consists of a variety of mandatory and optional items, including scanning parameters, related descriptive and record data, digitized fingerprint information, and compressed or uncompressed images. This information is intended for interchange among criminal justice administrations or organizations that rely on automated fingerprint and palm print identification systems or use facial/mug shot or SMT data for identification purposes. Other organizations have different standards as well for the content, format or units of measurement for biometric information.

The traditional method of finger print acquisition to meet such standards is to roll an inked finger onto a paper sheet. This method of rolling an inked finger onto a paper sheet converts the inked 3D finger print into a two dimensional (2D) image on the paper sheet. The 2D image of the inked 3D finger print is then converted into an electronic version, such as by scanning. The electronic fingerprint and palm-print images meeting specified standards allow for the rapid search of matching print images in extremely large databases of existing fingerprint and palm-print based records. For example, the FBI maintains an Interstate Identification Index System for fingerprints and palm prints.

Though the need for accurate and fast biometric identification is increasing, the above described known process of rolling an inked fingerprint has many limitations. The rolled ink print technique is slow and cumbersome and often produces finger prints and palm prints of poor quality. It requires a trained technician to grasp and manipulate a person's finger or hand, and even then it may take multiple attempts to successfully capture a print that meets industry standards. The rolled finger prints and palm prints can only be captured one at a time thus creating a very slow image capture process that may take 5 to 10 minutes or more. Small amounts of contamination or excessively dry or moist skin can hamper or even preclude the capture of an acceptable image. Finger prints and palm prints of some persons with fine or worn friction ridges cannot be captured. These disadvantages create a high acquisition and maintenance cost that has significantly limited the widespread use of biometric identification based on finger prints and palm prints.

Thus, a need has arisen for a more robust, fast and accurate system for biometric identification. In specific, a need has arisen for a system for hand print or finger print identification using biometrics that is fast, easy to use and accurate. In addition, a need has arisen for such system to be able to capture and process such images to meet current and future industry standards.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIGS. 2a and 2b illustrate an embodiment of the biometrics system of the present invention.

FIG. 3 illustrates another embodiment of the biometrics system of the present invention.

FIG. 4 illustrates another embodiment of the biometrics system of the present invention.

DETAILED DESCRIPTION OF THE INVENTION

The present invention is best understood in relation to FIGS. 1 through 15 of the drawings, like numerals being used for similar elements of the various drawings. The following description includes various specific embodiments of the invention but a person of skill in the art will appreciate that the present invention may be practiced without limitation to the specific details of the embodiments described herein.

Figure 1:
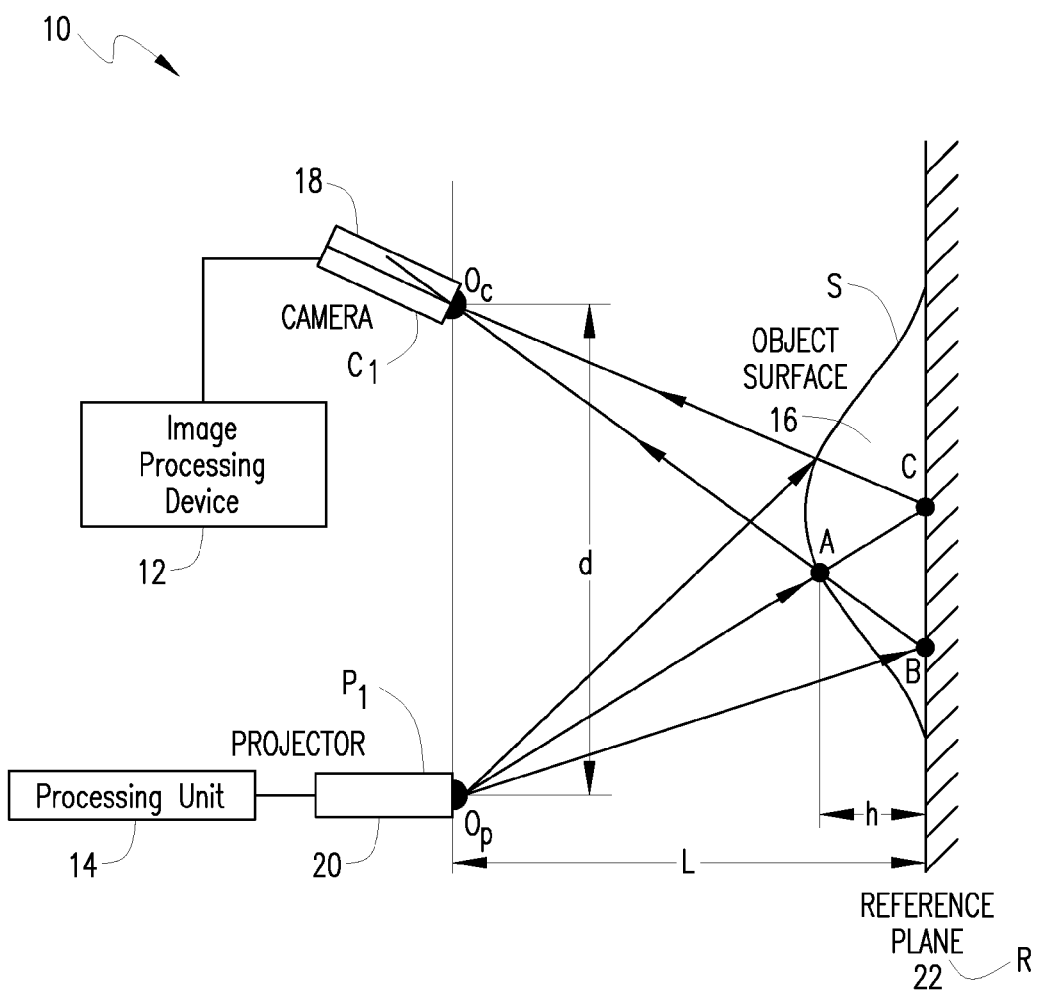
FIG. 1 illustrates an embodiment of a structured light illumination system of the present invention.

One approach to creating a 3D image is called a structured light illumination (SLI) technique. In SLI technique, a light pattern is projected onto a 3D object surface. FIG. 1 shows an example SLI system 10. In FIG. 1, the SLI system 10 includes a camera 18 and projector 20. The 3D object 14 is placed at a reference plane 22 that is a predetermined distance L from the projector 20 and camera 18. In this example, the projector 20 and camera 18 are in the same plane with respect to each other to simplify calculations, but such positioning is not required.

In use, the projector 12 projects a structured light pattern onto the 3D object surface 16. The structured light pattern can be a series of striped lines or a grid or other patterns, as discussed below. When the structured light pattern is projected onto the 3D object surface 16, it is distorted by the 3D object surface 14. The camera 18 captures one or more images of the 3D object surface 16 with the distortions in the structured light pattern. The one or more images are then stored in an image file for processing by the image processing device 12. In some embodiments of the present invention, multiple structured light patterns are projected onto the 3D object surface 16 by the projector 20, and multiple images of the 3D object with the structured light patterns are captured by the camera 18 or by other cameras added to the system shown in FIG. 1.

During processing of the image files, the distortions in the structured light pattern are analyzed and calculations performed to determine a spatial measurement of various points on the 3D object surface with respect to the reference plane 22. This processing of the images uses well-known techniques in the industry, such as standard range-finding or triangulation methods. The triangulation angle between the camera and projected pattern causes a distortion directly related to the depth of the surface. Once these range finding techniques are used to determine the position of a plurality of points on the 3D object surface, then a 3D data representation of the 3D object 16 can be created. An example of such calculations is described in U.S. patent application Ser. No. 10/444,033, entitled, "System and Technique for Retrieving Depth Information about a Surface by Projecting a Composite Image of Modulated Light Patterns," by Laurence G. Hassebrook, Daniel L. Lau, and Chun Guan filed on May 21, 2003, which is incorporated by reference here.

Much research has been conducted on the type of structured light patterns to use in SLI techniques. For example, at first a single stripe scanning system was proposed by J. A. Beraldin, M. Rioux, F. Blais, G. Godin, R. Baribearu, in "Model-based calibration of a range camera, proceedings of the 11$^{th}$ International Conference on Pattern Recognition: 163-167, the Hagure, the Netherlands (1992). Then, multiple stripe patterns with stripe indexing were proposed, see for example, C. Rochini, P. Cignoni, C. Montani, P. Pingi and R. Scopigno, "A low cost 3D Scanner based on Structured Light, Computer Graphics Forum" (Eurographics 2001 Conference Proc.), vol. 20 (3), 2001 pp. 299-308, Manchester, 4-7 Sep. 2001.

In "Channel Capacity Model of Binary encoded structured light-stripe illumination," by Raymond C. Daley and Laurence G. Hassebrook, in Applied Optics, Vo. 37, No. 17, June 1998, which is incorporated by reference herein, a technique is presented to enhance lateral resolution by multiplexing the light structure to produce interlaced and encoded images. In, "Composite Structured Light Pattern for Three-Dimensional Video," by C. Guan, L. G. Hassebrook and D. L. Lau, Optics Express, Vol. 11, No. 5 dated Mar. 10, 2003, which is incorporated by reference herein, a composite image comprising a plurality of modulated structured light patterns is described. Such composite image allows for recovery of the 3D depth map with a single image.

This analysis of relating distortion to surface points and use of various structured light patterns is a crucial part of the processing of the 2D captured images to create a 3D model. The present invention provides an optimized system and method for capture and processing of handprints and other biometric features using SLI techniques in an easy to use and cost effective manner.

FIGS. 2a and 2b illustrate one embodiment of the present invention. FIG. 2a illustrates a side view of a biometrics system 100 while FIG. 2b illustrates a front perspective view of the biometrics system 100. The biometrics system 100 uses SLI techniques to obtain images of a hand print as described herein, wherein a hand print includes either an entire hand print or a finger print or a thumb print or a palm print or a combination thereof.

The biometric system 100 includes a hand port 102 for insertion of a left hand or right hand. The hand port 102 includes a scan volume 104. In the embodiment of FIG. 1, the hand is positioned in the scan volume 104 with the palm down and with the back of the hand positioned on or in front of the backdrop 106. The backdrop 106 acts as the reference plane 22 shown in FIG. 1. The opening of the scan volume 104 can be a cloth or dark plastic that allows entry of a hand but helps prevent ambient light from entering the scan volume 104. The scan side 108 of the scan volume 104 is a transparent material, such as plastic or glass. Alternatively, the scan side 108 may be left open with no material between the hand and the SLI equipment below.

The SLI equipment includes one or more cameras 110 for capturing one or more hand print images of all or portions of a hand positioned within the scan volume 104. The cameras are preferably commercial high resolution digital cameras or may be specialty cameras designed and manufactured for the biometric system 100.

In addition, a projection unit 112 is positioned to illuminate all or a portion of a hand positioned within the scan volume 104 with one or more structured light patterns. Additional projection units 112 may also be incorporated into the biometric system 100 as explained in more detail below. A display 114, such as an LCD screen or other display type, provides a display of the scan volume 104. The display 114 is preferably positioned so that a subject can comfortably insert their hand and view the display 114 at the same time. The biometric system 100 is controlled by processor 116. Processor 116 may be a small personal computer or specialty processor unit that is connected to the cameras 110 and projection unit 112 through connections to USB ports on the cameras and projector, Ethernet LAN connections or other type of connection.

As seen in FIG. 2b, the display unit 114 displays the scan volume 104 and in this example, a right hand is positioned within the scan volume 104. One or more hand positioning pegs 118 are attached to the backdrop 106. The pegs 118 assist in proper placement of a hand within the scan volume 104 such that the field of views of the cameras 110 and projection unit 112 cover at least a portion of the hand. A first peg 118a is positioned to guide placement of a thumb on a right hand. A second peg 118b is positioned to rest between the second and third fingers of either a left hand or right hand. The third peg 118c is positioned to guide placement of a thumb on a left hand. A person of skill in the art would appreciate that one or more additional pegs or other hand positioning guides may be used to help guide proper positioning of a hand within the scan volume 104.

Each of the above parts is illustrated in FIGS. 2a and 2b in an enclosure 120. This arrangement within the enclosure 120 provides for a compact system that limits ambient light within the scan volume 104. The enclosure 120 also includes one or more adjustable supports 122 whose height may be adjusted to change the height of the enclosure 120 and so move the scan volume 104 up or down. This adjustment in height allows the biometrics system 100 to be in a comfortable position for a subject to insert their hand into the hand port 102. For example, if the enclosure 120 is placed on the ground, it may be more convenient to insert your hand into the hand port 102 if the height is increased. If the enclosure 120 is placed on a table top, it would be more comfortable to decrease the height of the hand port 102. Thus, the height of the enclosure 120 can be adjusted using the support legs 122. A person of skill in the art would appreciate that other height adjustment mechanisms may be used as well.

Though shown in an enclosure 120, a person of skill in the art would appreciate that one or more of the parts of the biometrics system 100 may be physically separated. For example, the display may be a separate LCD display connected by a cable to the cameras 112 and processor 116. The processor 116 may also be a separate PC or other processing device not incorporated within the enclosure 120, for example such that an operator may control the biometric system 100 with an external processor. In addition, the cameras 110 and projection unit 112 may be separate physical units positioned around a scan volume 104.

FIG. 3 illustrates another embodiment of the biometrics system 100. In this embodiment, the biometrics system 100 is configured to allow a hand to be positioned with palm facing upwards. Thus, the backdrop 106 will form the bottom or lower side of the scan volume 104 and the scan side 108 will be the upper side. The projection unit 112 and cameras 110 will be positioned above the scan side 108. The embodiment of FIG. 2 with a hand position of a palm down may be preferred because persons with mobility problems may not be able to rotate their hand for a palm up position. A person of skill in the art would appreciate that other configurations can include a swivel stand for the scanner that would allow adjustable rotation of the scan volume to 90 degrees or a full 180 degrees rotation. Such rotation would allow for adjustment so that a subject with limited mobility of their hand may comfortably use the biometrics system in any position or angle.

FIG. 4 illustrates another embodiment wherein the biometric system 100 includes two tandem scanners, one for the left hand and one for the right hand. A processor 116 may operate both systems. Two displays 114a and 114b may be used to display the left and right hand respectively or a single display may be used to display both hands. The biometrics system 100 in FIG. 4 allows for quick capture of handprints of both the left and right hand of a subject concurrently.

Figure 5A:
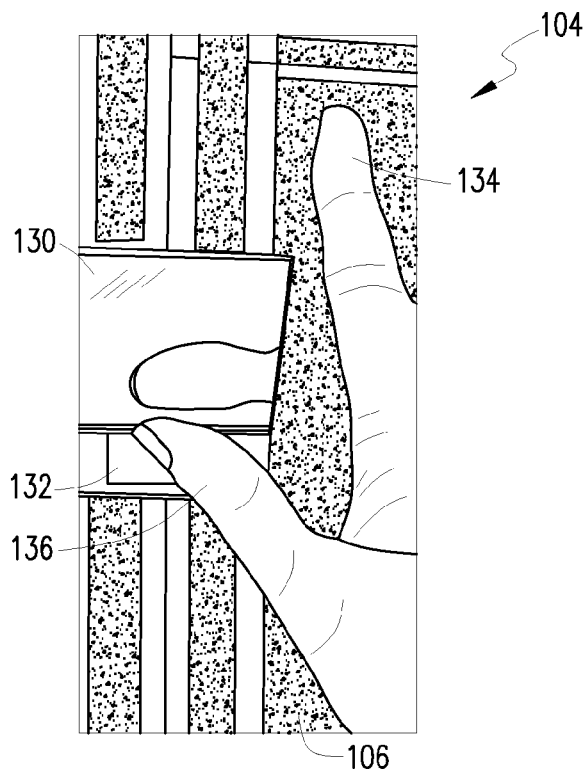
FIGS. 5a and 5b illustrate a more detailed view within a scan volume in one embodiment of the biometrics system of the present invention.
Figure 5B:
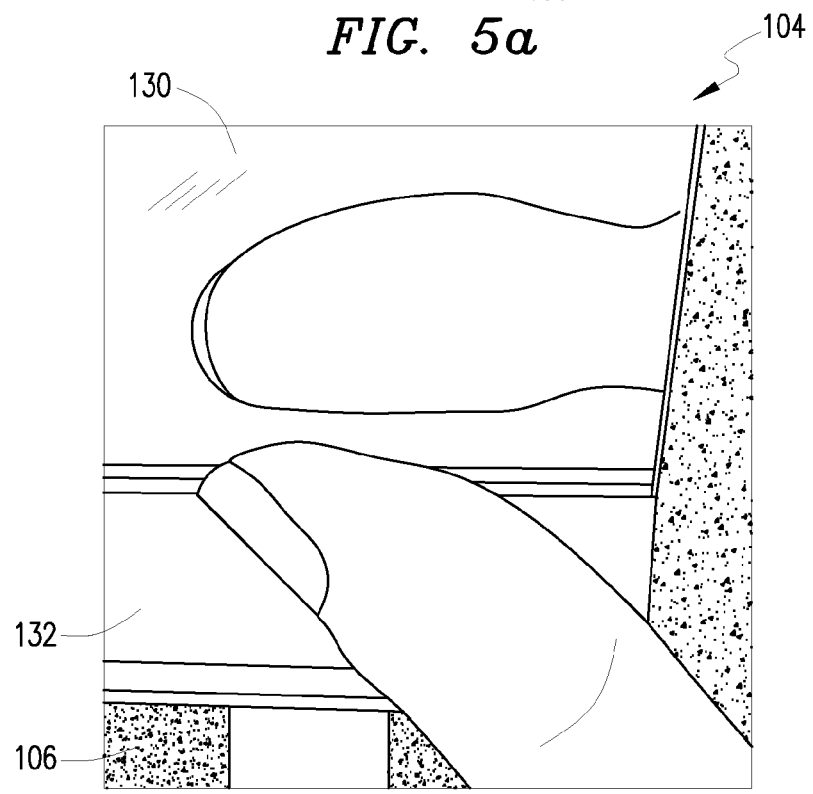

FIGS. 5a and 5b provide a more detailed view within the scan volume 104. One of the problems with SLI techniques is that the surfaces of the 3D object must be within the fields of view of the one or more cameras and projectors. Since a hand is 3D object, it has many curves, discontinuities and angles. Thus, it is difficult to place all surfaces of the hand within the fields of view of the cameras 110 and projection unit 112 when the hand is in one position. However, having to move the hand to multiple positions and capturing images in multiple positions would slow down the capture process.

One embodiment of the present invention solves this problem by utilizing mirrors that are within the fields of view of the cameras 110 and projectors 112 to reflect one or more hidden surfaces of the hand. For example, the scan volume 104 in FIGS. 5a and 5b illustrates a hand 124 that is positioned against the backdrop 106. Assuming the fields of view of the cameras are at the same angle shown, though the fingertip of the index finger of the hand 124 is visible, the complete thumb tip is not visible. So a mirror 130 is positioned on the backdrop 106. The mirror 130 is reflecting the thumb tip so it is visible in the reflection of the mirror. A thumb rest 132 helps to position the thumb for reflection in the mirror 130. The mirror 130 may also be recessed to reduce contamination from contact with a subject's thumb. Since the reflection of the thumb in the mirror is within the field of view of the one or more cameras 110 and projectors 112, wrap around scanning can occur of the thumb without having to adjust the position of the thumb.

In one embodiment of the biometrics system 100, the mirrors 130 have filters to only reflect one or more certain colors, e.g. light of certain wavelengths such as red, green, or blue. Since the projection unit 112 is projecting a structured light pattern onto the hand of the subject, the reflection of the mirror may interfere with the projection from projection unit 112, or it may be difficult to determine the pattern from the projection unit 112 versus the pattern reflected from the mirror 130. By placing a filter onto the mirrors 130, the mirrors 130 can be designed to reflect only a certain color such as red, green or blue. If multiple mirrors are implemented, each mirror may be designed to reflect a different color. Thus, the patterns reflected by the mirror can be discerned separately from the projections of the projection unit 112.

Alternatively or in conjunction with use of mirrors, a first set of one or more cameras 110 and one or more projectors 112 may be positioned at an angle ideal to capture the thumb print while a second set of one or more cameras and one or more projectors are positioned at an angle to capture the fingerprints. Though this solution may be more difficult and require more complex processing to stitch together a complete 3D model of an entire hand, it may have advantages when only separate images of thumbprints and fingerprints are needed.

The biometric system 100 can be operated in either an autonomous entry or operator controlled entry mode. In autonomous entry mode, the biometric system 100 does not require an external operator or control. The biometric system 100 can include an initiate button for a subject to initiate a hand scan or the biometric system can operate in a preview mode that continuously monitors for a hand image. In an operator controlled entry mode, an operator assists in operation of the biometric system 100 by assisting in correctly positioning the hand of a subject within the scan volume 104, initiating a scan, or verifying identification from a subject. The operator may also assist in processing the scan images and verifying valid images were obtained from the subject.

Figure 6:
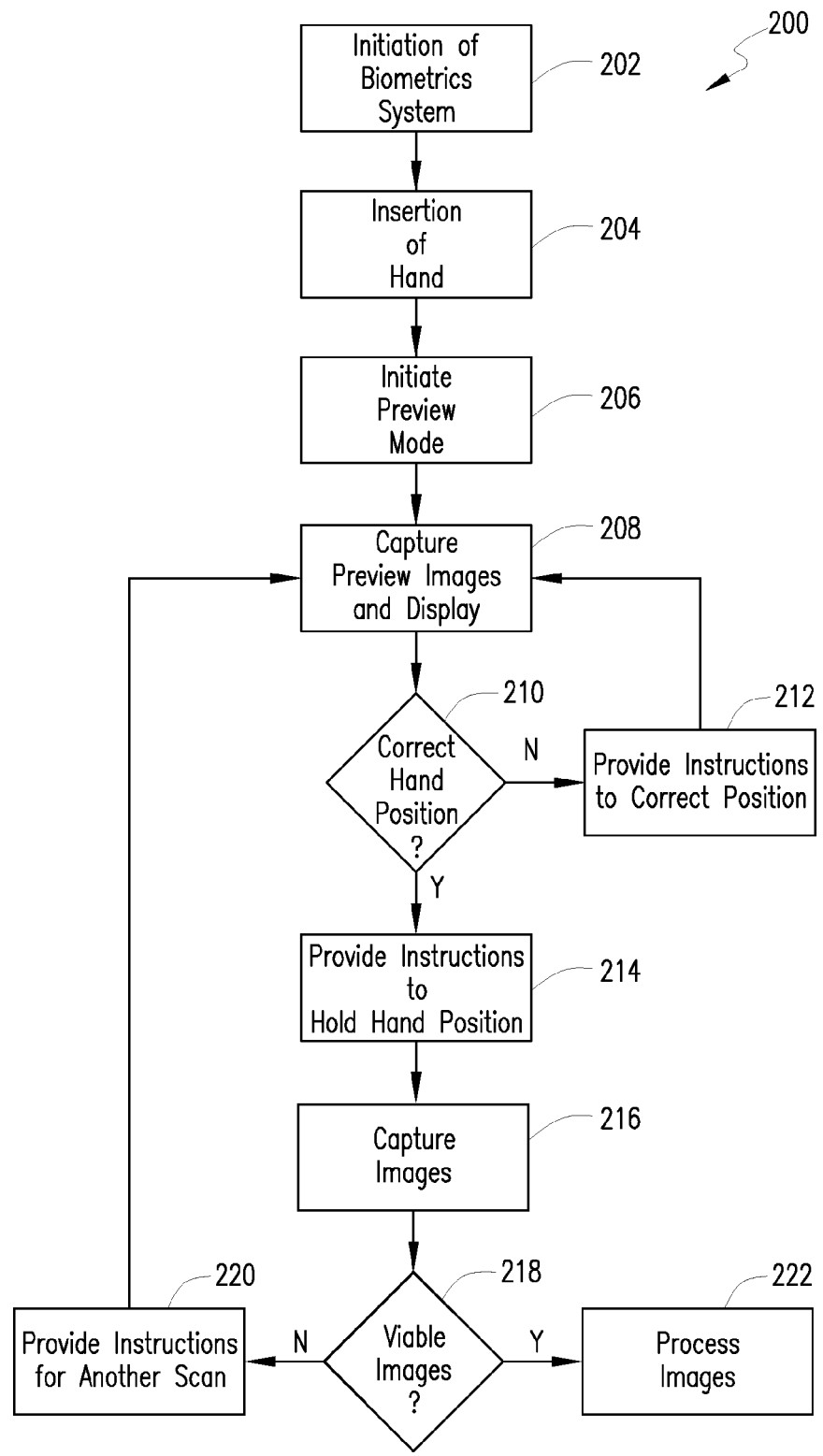
FIG. 6 illustrates one embodiment of a method for the biometrics system to capture handprint images of the present invention.

FIG. 6 illustrates one embodiment of a method for the biometrics system 100 to capture handprint images. In an autonomous entry mode or operator controlled entry mode, the biometrics system 100 monitors for insertion of hand or initiation by an operator or subject controlled input or other type of input. Once a subject inserts a hand into the scan volume 104 as shown in step 202, the biometrics system 100 begins a preview mode, as shown in step 204. During preview mode, the biometrics system 100 assists in and verifies correct hand positioning. Using the hand positioning pegs 118, the subject tries to correctly position their hand. The biometric system 100 captures low resolution images of the scan volume 104 as shown in step 206 and displays the images on the display 114. The subject can view their hand and the pegs 118 in the display 114 to assist in their hand positioning. The low resolution images are also acquired and processed by the biometric system 100 to determine correct hand positioning, as shown in step 210. For example in this step, the biometrics system 100 determines whether the placement of the tips of the fingers and thumb are within correct fields of view of the cameras 110 and projection unit 112.

As shown in step 212, the biometrics system 100 will prompt the subject with instructions if the hand is not correctly positioned with possible occlusion of part of the hand from the cameras 110 or projection unit 112. Such prompts may be verbal through an automated interactive voice response unit and microphone in the biometrics system 100. Or the instructions may be displayed on the display 114. Alternatively, the instructions may be provided to an operator who assists the subject in hand positioning. The method for providing such instructions and specific prompting instructions may be programmed or customizable by an operator as well.

The biometrics system 100 will continue to operate in preview mode capturing low resolution images and providing instructions until it determines that the subject's hand is correctly positioned within the scan volume 104. When the hand is correctly positioned, the biometrics system 104 then provides instructions to maintain hand position, as shown in step 214. The biometrics system 100 captures the hand print images needed for processing as shown in step 216. This step 216 is explained in more detail below with respect to FIG. 9. The biometrics system 100 then processes the images to determine if viable images were captured. If for some reason viable images were not captured, e.g. the hand was moved or an error occurred in surface reconstruction or otherwise, the biometrics system 100 detects such errors during processing of the images in step 218. It will then provide instructions for a second scan, as shown in step 220. The process will then return to preview mode again to assist in hand positioning for the second scan. Such process will continue until viable images have been captured. The viable images are then processed in step 222. The processor 116 may provide such processing as needed at the time to determine viable images and complete processing later. Or if identification is needed immediately for security reasons or to provide entry or access, then processing is completed then. If processing may be performed at a later time, images may be stored and processed by processor 116 or by another central computer as requested by an operator.

Though the process has been described with respect to handprint images, a person of skill in the art would appreciate that the biometrics system 100 and method described above could be used to capture images of other features.

Figure 7A:
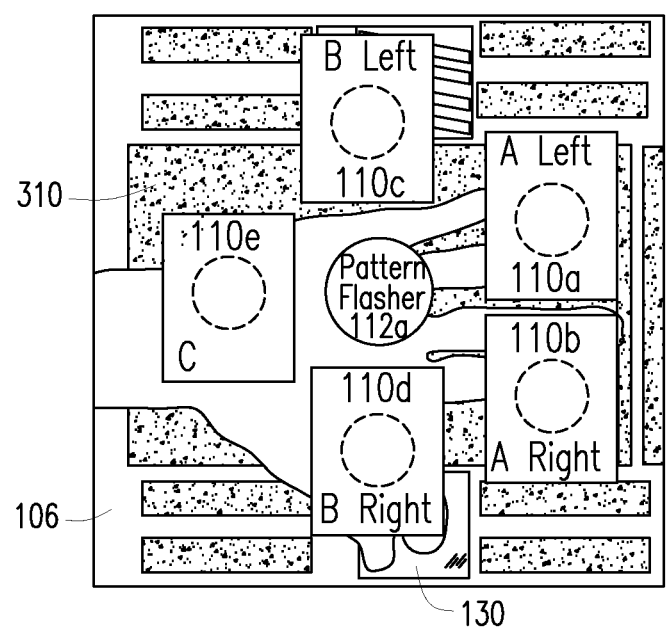
FIGS. 7a and 7b illustrate one embodiment of a configuration of the cameras and projection unit in the biometrics system of the present invention.
Figure 7B:
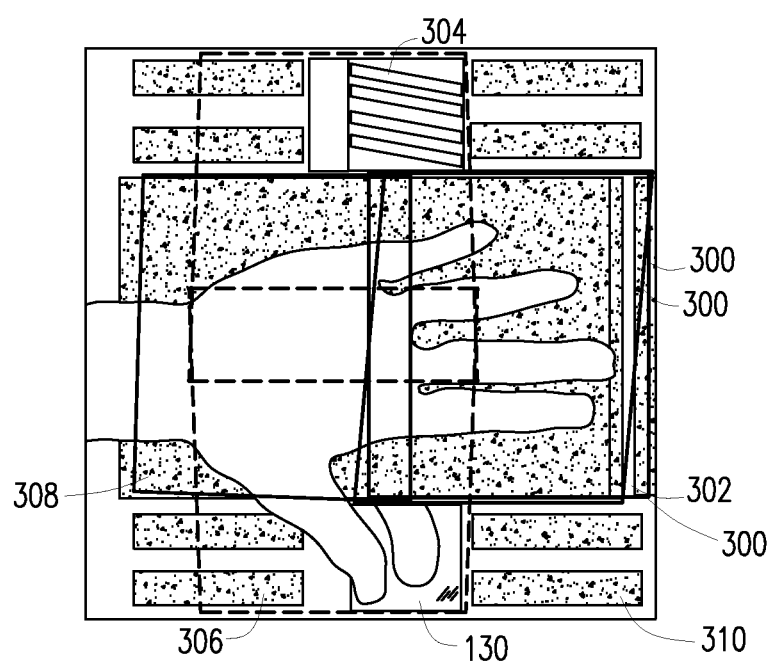

FIGS. 7a and 7b illustrate one embodiment of the configuration of the cameras 110 and projection unit 112 in the biometrics system 100. In FIG. 7a, the scan volume 104 is illustrated with a hand 124 positioned within the scan volume 104 on the backdrop 106. The arrangement of the cameras 110 and projection unit 112 below the scan side 108 is shown in diagram form. In this embodiment of FIG. 7a, five cameras 110a, 110b, 110c, 110d and 110e are arranged around a projection unit 112. Though the cameras 110a-e and projection unit 112 are shown in a certain arrangement in FIG. 7a, a person of skill in the art would appreciate that other arrangements may be used as well.

The fields of view of the five cameras in FIG. 7a are illustrated in FIG. 7b. The cameras 110a-e have been positioned such that their fields of view (FOV) cover the surface of the hand positioned within the scan volume 104. FOV A-Left 300 and FOV A-Right 302 capture the finger images. Either FOV B-left 304 or FOV B-right 306 capture the thumb and mirror images of the thumb, depending on whether the right or left hand is positioned in the scan volume 104. FOV C 308 and overlapping portions of FOV B-left 304 and FOV B-right 306 are used to obtain the palm images. As seen in FIG. 7b, some of the fields of view overlap. When fields of view overlap, the resolution and signal to noise ratio (SNR) may be improved in the processing of the images.

Several parameters are used to determine the number of cameras 110, and as such the number of fields of view, and the size of the fields of view. For example, the resolution in pixels per inch (ppi) and modulation transfer function (MTF) of the resulting images are important factors. To meet certain industry or application standards, the cameras must meet certain resolution, depth of field and MTF requirements. In this embodiment, each field of view is approximately a 5" by 4" region with the cameras having 2592 by 1944 pixels per inch (PPI) in order to obtain handprint images of at least 500 ppi. A person of skill in the art would appreciate that the resolution of the camera, MTF and size of the field of view affect the resolution of the resulting handprint images. So in order to obtain a specified resolution, these parameters must be designed accordingly. For example, fewer cameras with higher resolution and even larger fields of view may be used to obtain similar resolutions of the hand print images. Alternatively, more cameras at the same or less resolution with smaller fields of view may also be used to obtain similar resolutions of the hand print images. Another factor to consider is the cost of the system. More low cost, commercially available cameras with lower resolution may be more cost effective in the design than fewer, specialty high resolution cameras.

Figure 15:
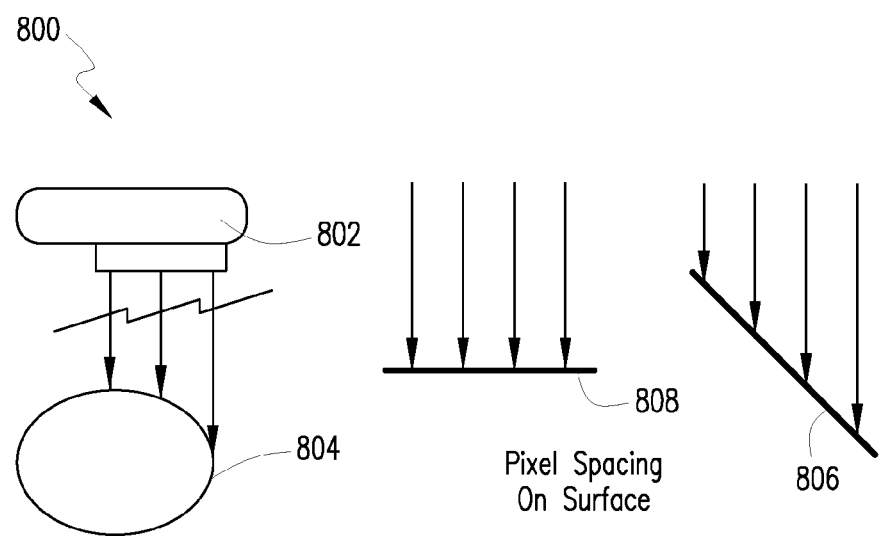
FIG. 15 illustrates an effective two dimensional resolution of an image as a function of angle of a surface of the present invention.

Another consideration in type of camera is the angles or curvatures of the surfaces. As seen in FIG. 15, the effective two dimensional resolution of an image is a function of angle. A camera 802 captures an image of a 3D object 804. When the 3D surface is relatively flat as surface 808, then the pixels per inch of the camera resolution is the same as the pixels per inch of surface captured in the image. However, for a curved or angled surface 806, the pixels have more distance between them across the surface. The 2D resolution drops in relation to the cosine of the angle of the surface. The following equation provides the effective resolution for surfaces:

$$0.25*PPI \text{ Resolution of Camera}*Cos(max\_angle \text{ of surface})$$

Thus, the resolution of the cameras 110 need to be selected in view of the angles of the surfaces for a handprint or other 3D object used in the biometrics system 100.

The embodiment of the biometrics system 100 shown in FIG. 7a includes one projection unit 112 positioned between the cameras 110a-e. The projection unit 112 projects the structured light pattern onto the hand during capture of images in order to construct a 3D model using SLI techniques, as discussed above. The projection unit 112 may be laser projector, CRT projector or digital projector. These types of projectors have an advantage that one such projector may project several different structured light patterns onto a surface as needed. Alternatively, the projection unit 112 may be a consumer or industrial flash with a specialized projection lens. The projection lens includes a structured light pattern slide for projecting onto a surface, as described in U.S. Provisional Application 60/744,259 filed on Apr. 4, 2006, "3 Dimensional Image Capture," with inventor Paul Herber, which is incorporated by reference here. Such a flash projector may be useful due to its speed, brightness and compactness.

Figure 8:
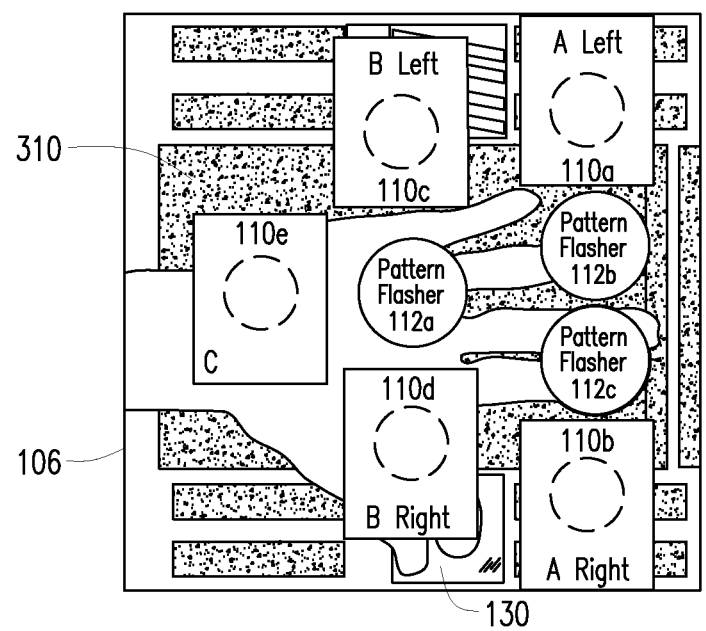
FIG. 8 illustrates another embodiment of the biometrics system with multiple projection units of the present invention.

FIG. 8 illustrates another embodiment of the biometrics system 100 with multiple projection units 112a, 112b and 112c. Use of the multiple projectors 112a, 112b and 112c has an advantage that each projection unit 112 in FIG. 8 may project the structured light pattern at different angles within the scan volume 104 to cover more of the hand surface. In order to reconstruct the 3D surface representation using SLI techniques, the structured light pattern must be projected onto the surface and captured in an image. With one projection unit 112, some surfaces may not be within its field of view, such as the sides of the fingers and curves around the thumb. The multiple projection units 112 are able to project and cover more surface areas of the hand within the scan volume 104. Though the cameras 110a-e are in slightly different positions than in FIG. 7a, they may be angled and focused to have similar fields of view as shown in FIG. 7b. Of course, a person of skill in the art would appreciate that different positions of fields of view may be designed depending on the cameras and coverage desired.

FIGS. 7 and 8 also illustrate a background pattern 310 on the backdrop 106. The background pattern 310 has a vital role in calibration and processing of the hand print images in biometrics system 100 and is shown in more detail with respect to FIGS. 9a and 9b.

Figure 9A:
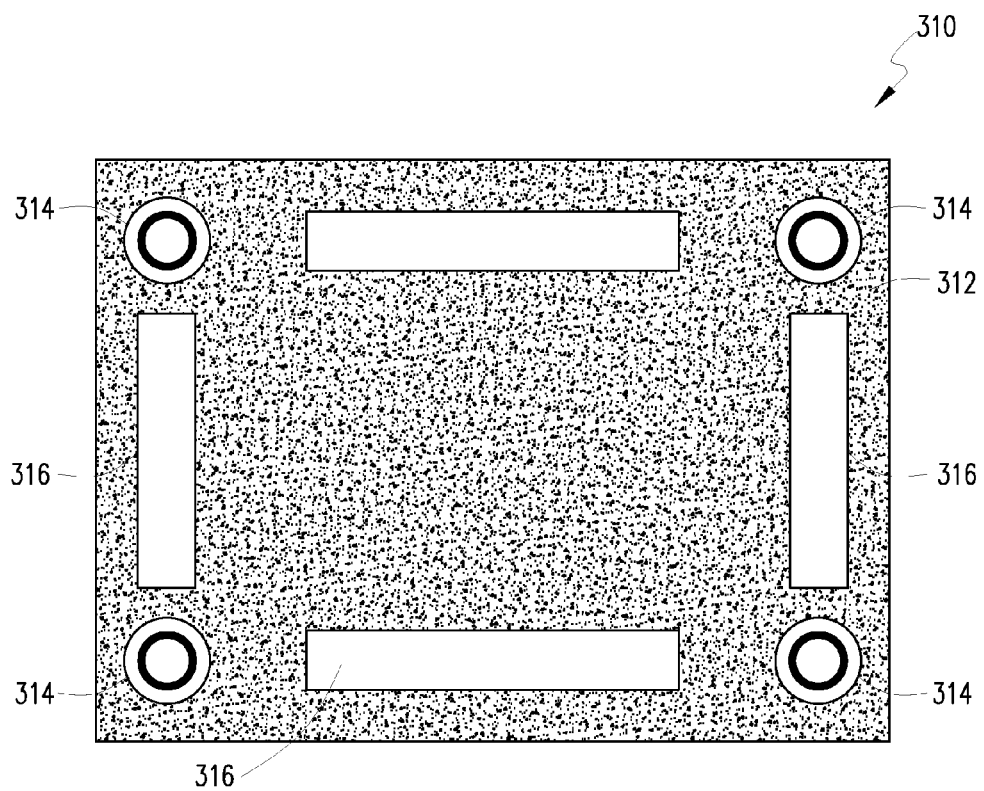
FIGS. 9a and 9b illustrate one embodiment of a backdrop pattern and fiducials used for calibration and alignment in the biometrics system of the present invention.

The background pattern 310 preferably includes one or more types of patterns as shown in FIG. 9a. First, the background pattern includes a "non-repeating" or fine pattern 312 such that a portion of the pattern 312 is distinct in any particular area. The fine pattern 312 is used for fine calibration and alignments. The fine pattern 312 is preferably a pseudo-random digital noise pattern or may be other types of patterns that provide distinct features. Some repetition may be included in the fine pattern 312 as long as the pattern is sufficiently distinct to provide alignments of different fields of view or partitions and calibration. Thus, the fine pattern means any type of pattern, regular or noise pattern that allows any point within the pattern to be uniquely determined by edge characteristics, labeling, fiducial proximity, or other characteristics. Second, the background pattern includes one or more fiducials 314 for course alignments and calibration. Third, the background pattern 310 includes projection areas 316 for pattern projection calibrations. The projection areas 316 are preferably white or a solid color and used to determine the intensity of color of the structured light patterns on the background. Thus, the effect of the color of skin of the hand surface on the intensity of the structured light pattern can be determined. The background pattern 310 is three dimensional with well defined tier and surface heights. This is necessary to calibrate the scan volume accurately. The depth range of the background pattern 310 should span that of the scan volume depth or the depth of a portion of the 3D object to be scanned for most optimum calibrations. The background pattern 310 is in black and white or other high contrast colors to differentiate the pattern. During provisioning of the biometrics system 100, the exact world coordinates of the background pattern in the point cloud of the scan volume 104 are measured as well as intensity of the structured light pattern in captured images. These reference measurements are thus known and predetermined before a hand scan.

When the hand print images are captured, the background pattern 310 is part of the field of view of the cameras 110 and so incorporated into the handprint images. The known world coordinates and intensity of the background pattern 310 from the reference measurements are compared during processing of the handprint images into a reconstructed 3D surface. Calibration parameters are then modified to match the known reference measurements during the surface reconstruction. For example, the processing unit may make adjustments to the calibration parameters from calculating coordinates of the backdrop pattern 310 in a handprint image and comparing them with the predetermined coordinates of the backdrop pattern. Thus, calibration can be performed as part of the processing of each and every hand scan.

In addition, the intensity of color of the structured light patterns on the projection areas 316 can be determined for each hand scan. Differences in ambient light or projection units' intensity over time may alter the intensity of color of the structured light patterns. By knowing the pattern projection on the white projection areas, the color or shading of the skin of the hand surface can be determined. The albedo or effect of the color of skin of the hand surface on the intensity of the structured light pattern can be compensated for during processing.

Figure 9B:
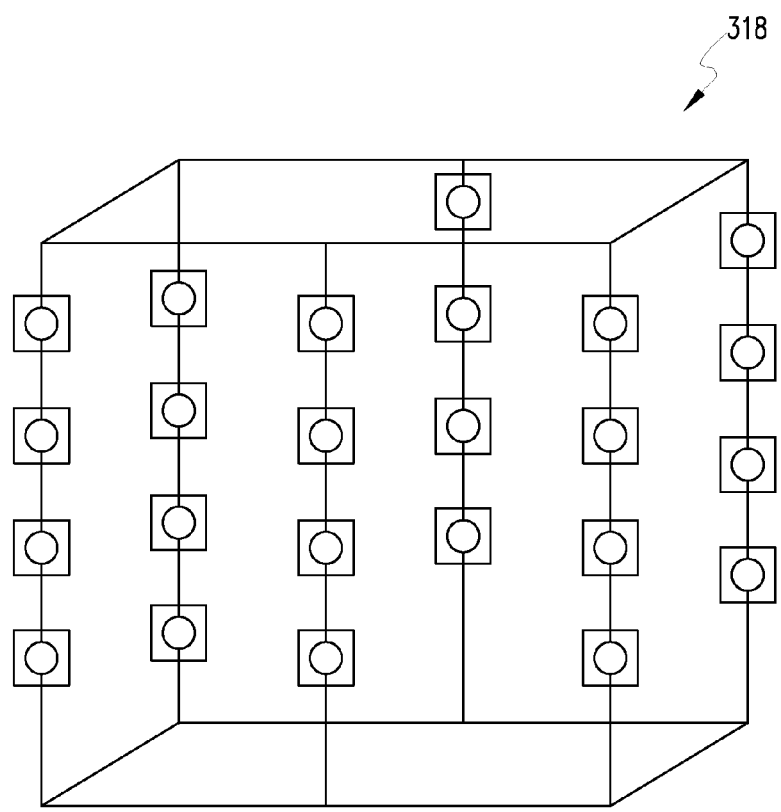

Using the background pattern 310 for calibration is superior to use of fiducials for calibration alone. FIG. 9b illustrates a fiducial structure 318 that may be used for calibration. In the fiducials technique, fiducials or markers at known distances are imaged at provisioning to determine calibration parameters. However, this fiducials technique is too cumbersome and time consuming to be performed before each and every hand scan. So it can not compensate for drift in the equipment setup and positions or affects from auto focusing or other distortions that may occur over time.

In addition, the use of the known world coordinates of the background pattern 310 can be used to align or stitch together the various images from the cameras 110. Since the background pattern 310 is a random noise pattern, the unique position of a portion of the backdrop pattern 310 in an image can be matched to its overall position in the background pattern. Thus, these known world coordinates of the background pattern 310 in each image can be used to stitch together or align the images with respect to the background pattern 310. Any ambiguities may be resolved by matching details in the handprints such as matching ridge locations. Thus, the background pattern 310 has advantages in both the calibration and alignment processing of the handprint images.

Figures 10A, 10B:
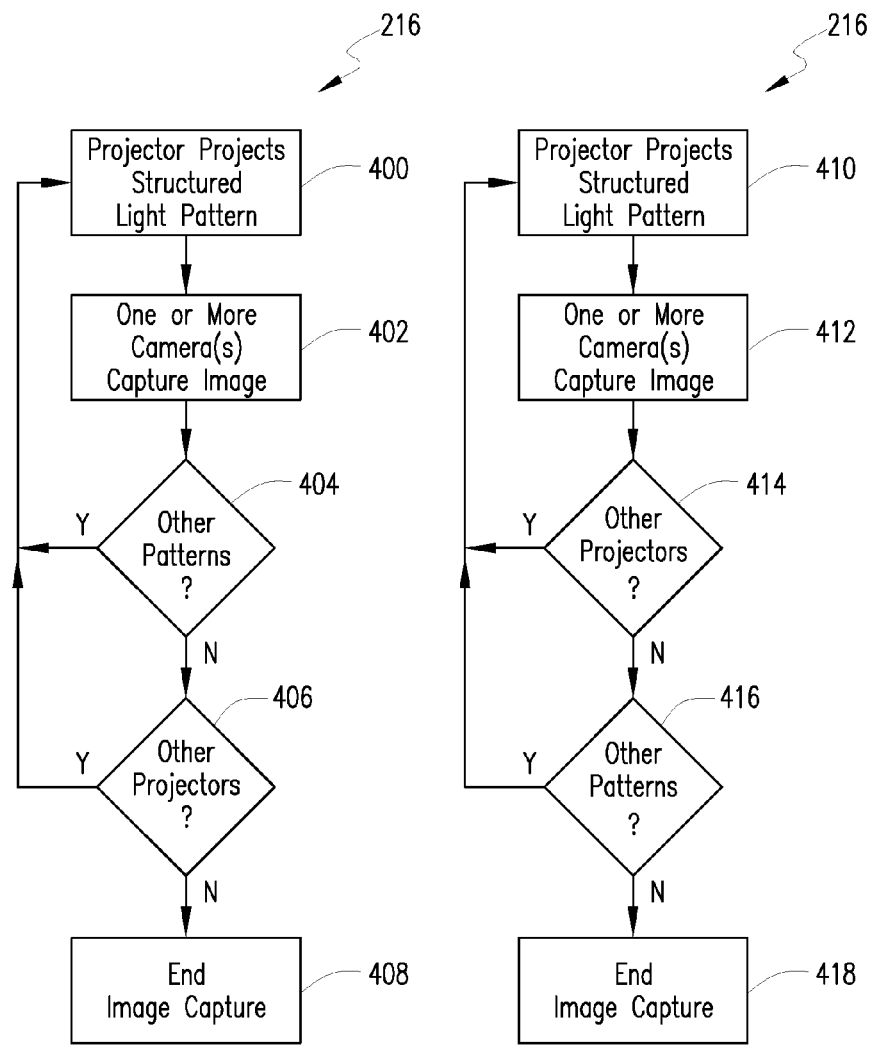
FIGS. 10a and 10b illustrate embodiments of the image capture process of the biometrics system of the present invention.

The operation of one embodiment of the biometrics system 100 to capture handprint images is now explained in more detail with respect to FIG. 10a. As shown in FIG. 6 step 216, the one or more cameras 110 and projection units 112 capture the handprint images. FIG. 10a illustrates one embodiment of this image capture process of step 216 in more detail. Prior to this image capture process, it is assumed that the hand has been correctly positioned within the scan volume 104.

In the first step of the image capture process of the embodiment in FIG. 10a, the first projection unit 112a projects a first structured light pattern within the scan volume 112 and onto the surface of the hand positioned therein. Each of the one or more cameras 110 captures an image of the hand from its respective field of view. The cameras 110 may capture such images concurrently to save time and before movement of the hand. The projection unit 112 must be calibrated to project the structured light pattern for a period at least equaling the acquisition window of all the cameras 110. If only a first structured light pattern is being used for the SLI technique, then the next projector projects the structured light pattern. Or if only one projector is in use, as shown in the embodiment of FIG. 7, then the image capture process ends.

If more than one structured light pattern is being used for the SLI technique, than the first projection unit 112a projects a second structured light pattern within the scan volume 104 and onto the surface of the hand positioned in the scan volume. The one or more cameras 110 again each capture an image of the hand from their respective field of view while the second structured light pattern is projected thereon. This process continues until the first projection unit 112a has projected each structured light pattern needed for the SLI technique and the cameras have captured an image of the hand with each structured light pattern. Then the process moves to the next projection unit 112b. The second projection unit 112b projects the first structured light pattern within the scan volume 112 and onto the surface of the hand positioned therein. Each of the one or more cameras 110 captures an image of the hand from its respective field of view. This process continues until the second projection unit 112b has projected each structured light pattern needed for the SLI technique and the cameras 110 have captured an image of the hand with each structured light pattern. The process is continued for a third projection unit 112c or any other projection units 112 that may be implemented in the biometrics system 100.

The operation of another embodiment of the biometrics system 100 is now explained in more detail with respect to FIG. 10b. In FIG. 10a, multiple projection units 112 sequentially project a required structured light pattern while cameras 110 capture images. This embodiment may have advantages with multiple projection units that need some time to switch between structured light patterns. Thus, it may be faster to allow a rotation between projection units 112 to project images. After projection unit 112a has projected a first structured light pattern, projection units 112b or 112c are projecting the first structured light pattern and projection unit 112a may switch to a second structured light pattern.

As explained above, various SLI techniques may be implemented within the biometrics system 100. The SLI technique must be able to attain the overall hand, finger and thumb shapes as well as fine detail such as finger ridges and pores. One SLI technique that meets such requirements is called multi-frequency Phase Measuring Profilometry (PMP). Multi-frequency PMP is described in, Veera Ganesh Yalla and L. G. Hassebrook, "Very High Resolution 3-D Surface Scanning using Multi-frequency Phase Measuring Profilometry," edited by Peter Tchoryk, Jr. and Brian Holz, SPIE Defense and Security, Spaceborne Sensors II, Orlando, Fla., Vol. 5798-09, (Mar. 28, 2005), which is incorporated by reference herein and Jielin Li, L. G. Hassebrook and Chun Guan, "Optimized Two-Frequency Phase-Measuring-Profilometry Light-Sensor Temporal-Noise Sensitivity," *JOSA A*, 20(1), 106-115, (2003), which is incorporated herein.

Figure 11A:
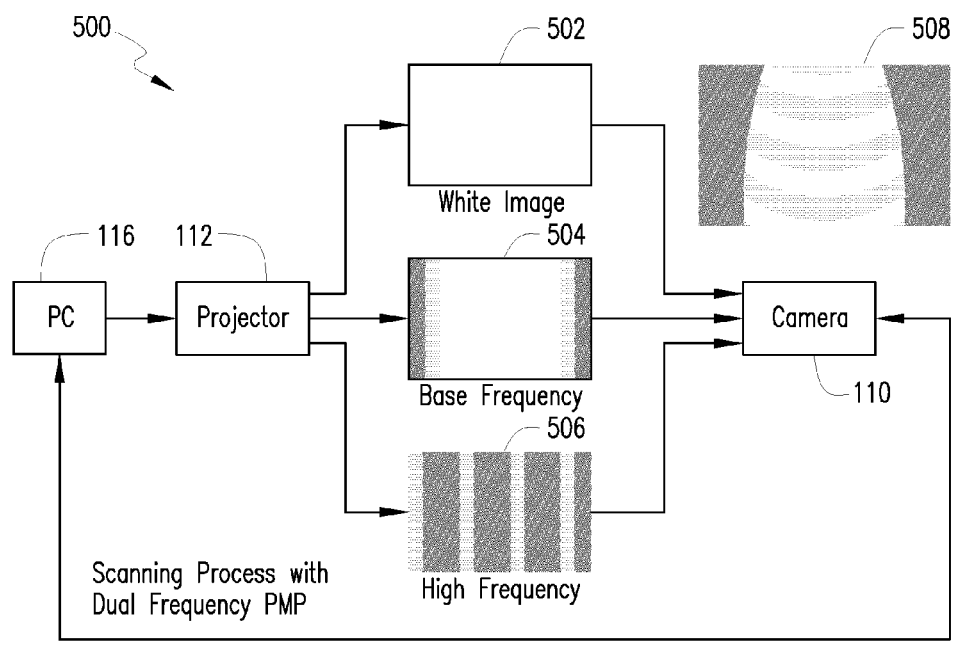
FIGS. 11a, 11b, 11c and 11d illustrate embodiments of structured light patterns that may be used in the image capture process of biometrics system of the present invention.
Figure 11B:
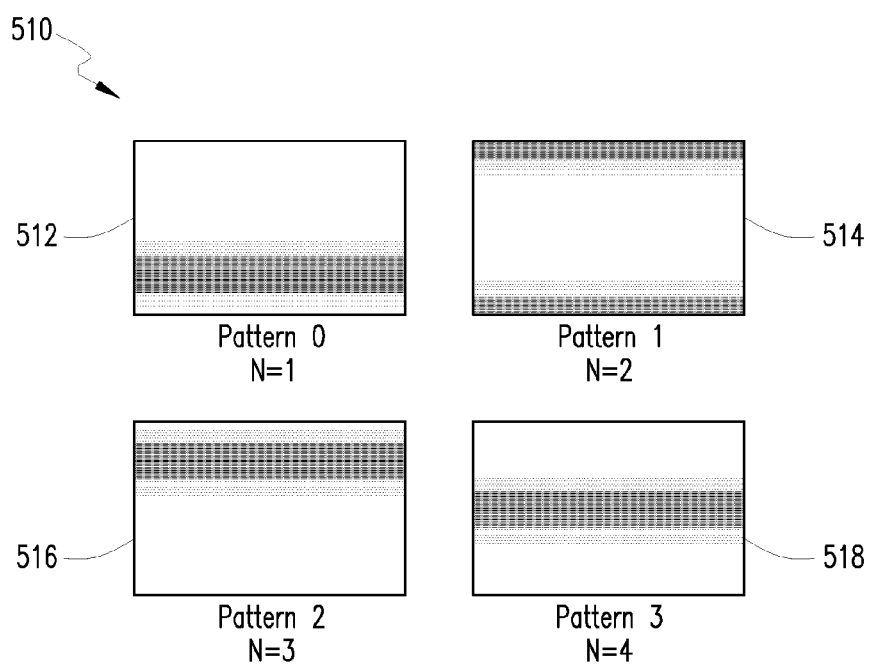

FIGS. 11a and 11b illustrates a novel approach to multi-frequency PMP technique 500 that may be used in one embodiment of the biometrics system 100. Though FIG. 11 only illustrates a single projection unit 112 and camera 110, a person of skill in the art would understand that multiple projectors and cameras may be used as described above. The basic PMP technique projects shifted sine wave patterns onto the 3D object, such as thumb 508 and captures a deformed fringe pattern for each phase shift. The projected light pattern is expressed as:

$$I_n(x^P, y^P) = A^P + B^P \cos(2\pi f y^P - 2\pi n/N)$$

where $A^P$ and $B^P$ are constants of the projector, f is the frequency of the sine wave and $(x^P, y^P)$ is the projector coordinate. The subscript n represents the phase-shift index. The total number of phase shifts is N. FIG. 11b shows an example of PMP base frequency patterns 510 with four phase shifts, e.g. N=4. Thus, as seen in FIG. 11b, there are four different phase shifts 512 through 518 of the sine wave at a base frequency. The camera 110 captures an image with each of the patterns projected onto the 3D object. The captured image is distorted by the 3D object topology and such distortions can be analyzed to determine the phase value and then the depth changes or world coordinates of the 3D object at each pixel of the image can be determined. The sine wave pattern is designed so the depth changes are not affected by perspective by using epipolar lines and a special method of rectification that minimizes the affects of perspective. So with the phase shifts in the sine wave patterns caused by ridge depth variation as well as average surface depth, the phase of the sine wave pattern is unwrapped into a continuous, nonrepeating phase value across the entire surface within each partition.

Multi-frequency PMP is derived from the single frequency PMP technique described above. In multi-frequency PMP, $f_i$ different frequencies are projected, where i=2 to $N_f$ and $N_f$=number of frequencies to be projected. At each of the $f_i$ different frequencies, N different phase shifts are projected. As seen in FIG. 11a, two different frequency patterns are projected in one embodiment of the present invention—a base frequency pattern 504 and high frequency pattern 506. For example, as seen in FIG. 11a, the base frequency f equals 1, while the high frequency f equals 4. For each of the frequencies, N phase shifts are used, where N>2. The low or base frequency sine pattern 504 is optimal for capture of overall hand shape, finger and thumb shapes. The high frequency sine pattern 508 is optimal for capture of finer details, such as finger print ridges and pores. The high frequency sine pattern 508 must have a resolution sufficient to extract finger print ridge information. Sine wave patterns also have an advantage that they effectively further extend the depth of focus of the system. Digital cameras use relatively small sensors and thus have lenses with short focal lengths and correspondingly large depth of focus. A blurred sine wave pattern remains as a sine wave but with an addition of a DC component. The DC component effectively decreases SNR but the 3D surface can still be acquired. Though FIG. 11*a* only illustrates two frequencies f used in the multi-frequency PMP technique, a person of skill in the art would appreciate that other frequencies or only a single frequency may also be used in other embodiments of a biometric system 100.

In addition, to the two PMP patterns, a third albedo pattern is projected, wherein the third albedo pattern is a plain white image as seen in FIG. 11*a*. The albedo pattern or white pattern is used to capture texture or albedo of the hand surfaces without a structured light pattern. The albedo image serves an important role. The albedo value is proportional to the reflectivity of the surface, e.g. the fraction of light striking a surface that is reflected by that surface. The albedo image helps determine a percentage of the sine wave pattern that will be reflected and how much will be absorbed by the skin surface and hence how bright the structured light pattern will be at a particular point on the skin surface. As such, the albedo variation can be removed from the structured light image and from the brightness of the sine wave pattern, so that the phase value of the structured light pattern at a particular point on the skin surface can be determined.

In another embodiment of the present invention, the multi-frequency PMP patterns in FIG. 11*a* have a different color. In this multi-frequency, multi-color PMP pattern technique, each color channel has its own frequency, and then each frequency would be shifted by the desired number of phase shifts N. For example, the base frequency structured light pattern 504 would be red, and N red patterns with N phase shifts at the base frequency would be projected by the projection unit 112. Then, the high frequency structured light pattern 508 would be green, and N green patterns with N phase shifts at the high frequency would be projected by the projection unit 112. The multi-color PMP pattern has an advantage because the spatial frequency f is constant for a given color channel, the surface albedo has no affect on the recovered phase value.

There can be many different configurations or combinations in the multi-frequency, multi-color PMP pattern technique. For example, N>3 phase shifts with color encoding of three frequencies can be used as a color encoding techniques but that is relatively independent of surface color. In this case in particular 3 frequencies are encoded into the RGB pixel space where R may contain the base frequency of f=1 and G and B would contain the pattern sequence for higher frequencies. Since PMP technique is insensitive to color, then within each color space, the reconstructed phase result would also be insensitive to the surface color and albedo.

In another the multi-frequency, multi-color PMP pattern technique, the number of phase shifts N=3 with color encoding of 3 frequencies. The three color channels are preferably Red, Green and Blue but in theory can be a large number of spectral components. With 3 color channels then any 9 pattern combination can be used with color encoding.

Figure 11C:
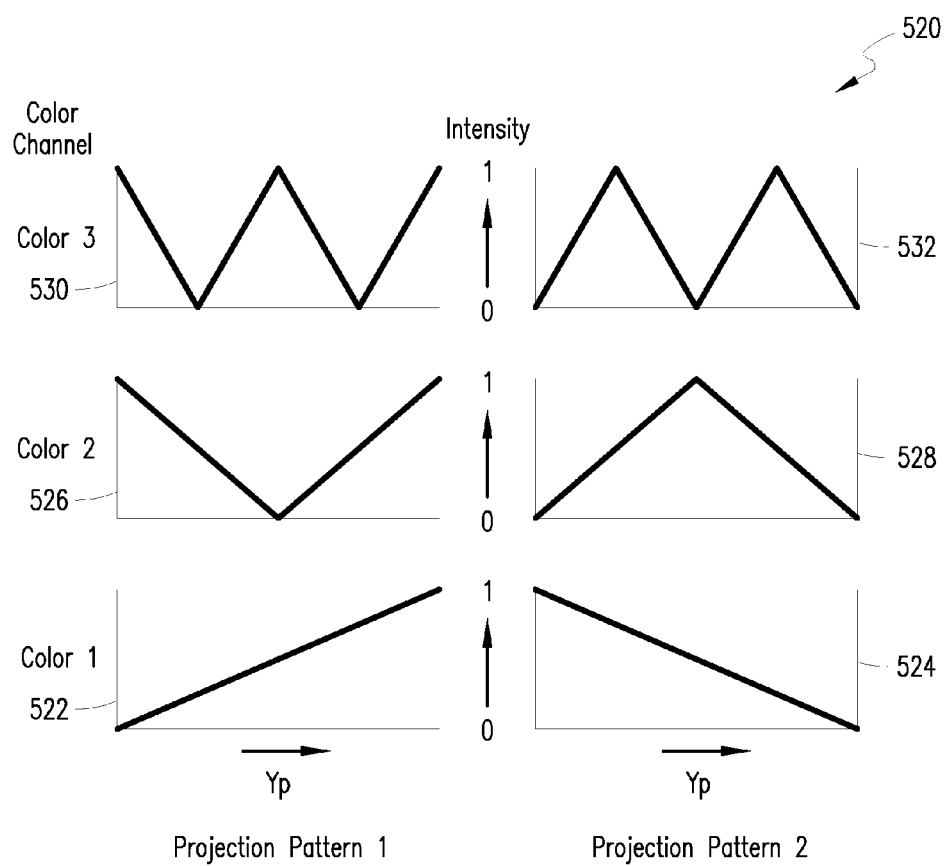
Figure 11D:
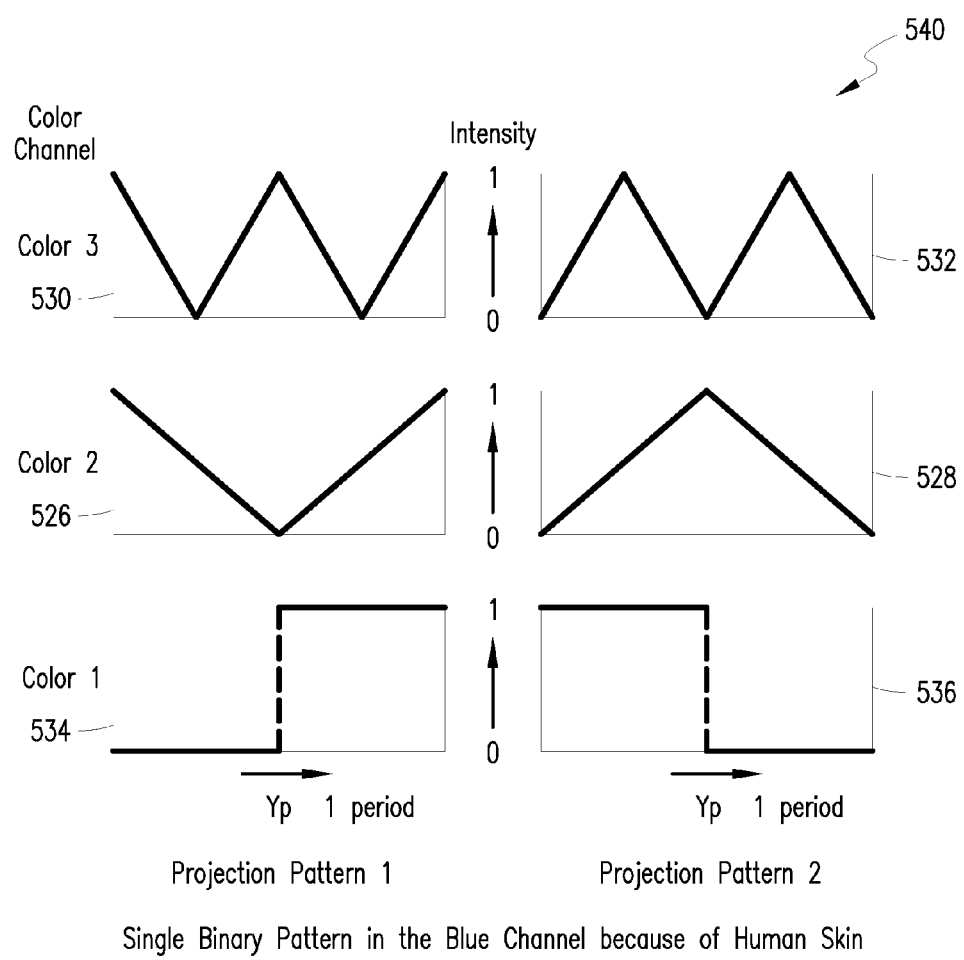

In another embodiment, the PMP technique can be applied to a linear ramp or triangle waveforms, rather than sine waves. An example of three color triangle PMP technique 520 is shown in FIG. 11*c*. In this example, there are three patterns or frequencies used each with N=2 phase shifts. The first color 1 is a low frequency triangle or ramp with a positive slope in the first structured light pattern 522 from zero to one intensity and a negative slope ramp in the second structured light pattern 524 with one to zero intensity. The ramp waveform can be modeled as a partial triangle waveform at a low frequency. In second color 2, the first pattern 526 is a triangle waveform with a first phase and the second pattern 528 is the triangle waveform with a second phase. The third color 3, the first pattern 530 is a triangle waveform with a first phase and the second pattern 532 is the triangle waveform with a second phase. The frequency f of color 1 is at the low or base frequency. In the example of FIG. 11*c*, the color 1 has a frequency f equals 0.5 of a triangle waveform, the color 2 is at a mid frequency, e.g. f equal 1 while color 3 is at a high frequency, e.g. f equals 2.

In this ramp/triangle PMP technique, as few as two gradient ramps, each with opposite slopes, can be used to decode a unique phase value and albedo value. The intensity difference at any point will give the phase value and the intensity sum at any point will give the average albedo value of the surface. With shorter spatial periods the ramps become triangles waveforms, or repeating ramps. So, one color may be a low frequency or single light intensity ramp across the field of view. The next color would be sharper ramps that repeat and the third color would be even higher frequency gradient ramp intensity waveforms. Just like PMP, the low frequency is used for non-ambiguous decoding of the phase and the higher frequency, with sharper gradients are used to more accurately detect ridge height variations. The ramp/triangle wave form has advantages over the sine wave because the sharp edge or tip of the triangle or ramp provides a good point to establish albedo values. Though only two phase shifts are shown in FIG. 11*c*, it may be preferred to have three or more phase shifts at each color channel or frequency.

FIG. 11 *d* illustrates another embodiment of a color ramp/triangle PMP technique 540. In this embodiment, the blue color pattern is a simpler pattern. In experiments and trials conducted, it has been determined that the blue color is attenuated by human skin to a much higher degree than red or green colors. Thus, rather than having a sine wave, ramp, triangle or other pattern, only a very simplified on/off or binary pattern is projected in the blue color channel. As seen in FIG. 11*d*, the first blue pattern 534 has a first half color intensity of "0" or dark or "off" and the second half is a light intensity of "1" or "on". In the second blue pattern 536, the first half has a color intensity of "1" or "on" and the second half is "0" or dark. Since the blue color is attenuated to a high degree in comparison to other colors, it is recommended to have a simple pattern or binary pattern in comparison to the other colors green and red.

In another embodiment, weighted combinations of Red, Green and Blue can be used to encode more than 3 patterns into 3 colors. Theoretically 3 colors can be used to contain up to 256^3 unique colors. However a practical combination may contain 8 distinguishable colors. Thus, in a single projection pattern, there may be 8 separate component patterns. To improve this further, a second projection pattern, such as albedo pattern 502 in FIG. 11*a*, could be used to recover the albedo which can be used to counteract the weighting effects of the surface color and separate out the reflected component patterns.

In fact, the albedo pattern 502 can be used in addition to any of the above techniques to recover the albedo values and also for color correction of the color encoded patterns. The albedo pattern can be used to determine the color ratios of the hand surface. That is if the hand surface has Red, Green, and Blue ratios as 1, 1.5 and 0.2, then the colors in the structured light patterns can be compensated by scaling by 1, 1/1.5 and 1/0.2 respectively.

Though the above description of the SLI technique included multi-color and multi-frequency PMP patterns along with an albedo pattern, other SLI techniques may be implemented, such as a single structured light pattern may be implemented. A single structured light pattern would increase the speed of acquisition of the handprint. Such a single structured light pattern for example may be a composite image comprising a plurality of modulated structured light patterns, as described in U.S. patent application Ser. No. 10/444,033, entitled, "System and Technique for Retrieving Depth Information about a Surface by Projecting a Composite Image of Modulated Light Patterns," by Laurence G. Hassebrook, Daniel L. Lau, and Chun Guan filed on May 21, 2003, which is incorporated by reference here. Alternatively, a simple sine wave pattern in one of the image color components, such as the "Green" color component may be used for the SLI technique while the "Red" and "Blue" color components are used to extract the albedo values.

Alternatively, three colors such as red, green and blue can be used to create up to $256^3$ unique color patterns. However, a practical combination may contain 8 distinguishable colors. Thus, in a single projection pattern, there may be 8 separate component patterns. To improve this further, a second projection pattern could be used to recover the albedo which can be used to counteract the weighting effects of the surface color and separate out the reflected component patterns.

Figure 12:
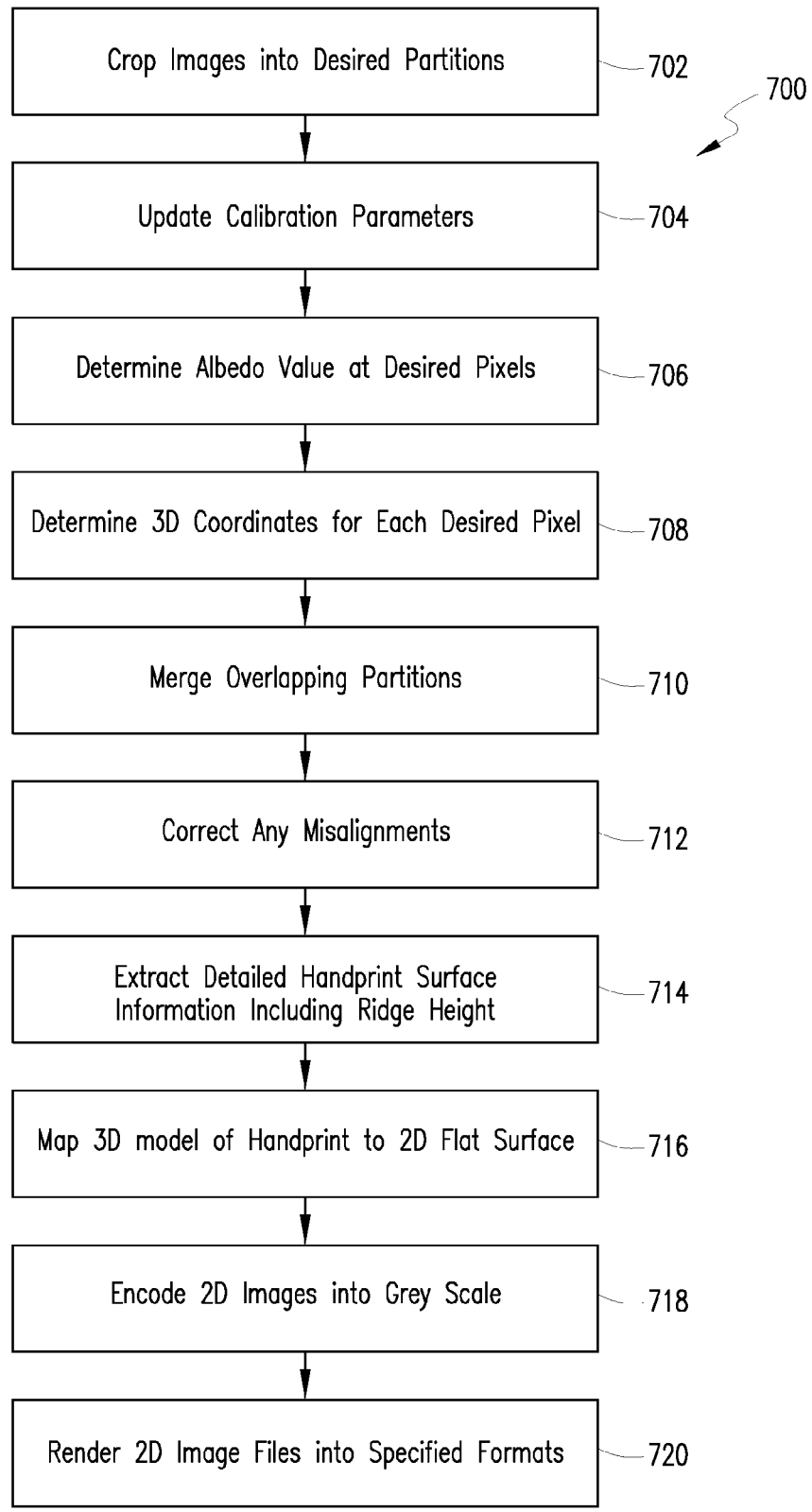
FIG. 12 illustrates one embodiment of a method for image processing in the biometrics system of the present invention.
Figure 13:
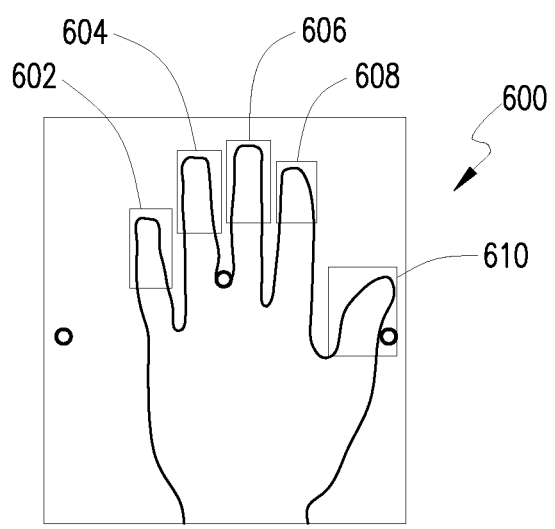
FIG. 13 illustrates an image of a handprint with partitions for processing of the present invention.

FIG. 12 illustrates one embodiment of the image processing step 222 from FIG. 6. Once viable images are captured, the handprint images are processed to obtain equivalent 2D rolled ink fingerprint images. In the first step 702 of FIG. 12, the handprint images are cropped into desired partitions for processing. To ease processing, each complete image or field of view from each camera may not be processed in its entirety. The handprint images may be cropped into partitions that include the areas of the handprints desired for the particular application. For example, FIG. 13 illustrates an image of a handprint 600 with partitions. The partitions 602, 604, 606, 608 of the fingerprints and partition 610 of the thumbprint may be cropped for processing. These partitions may be stitched together or aligned with partitions from other images as well. The background pattern 310 can be used to quickly identify location of the fingertips, thumb or other areas and the desired coordinates of the partitions.

In step 704 of FIG. 12, calibration parameters and transformation coefficients are updated based on the known reference measurements of the background pattern 310 shown in the handprint images. In step 706, the albedo images are processed to determine average albedo value or color intensity of each pixel.

In step 708, the 3D coordinates of hand in the handprint images are determined. The 3D world coordinates (x,y,z) of each pixel in the handprint images with respect to the reference plane in the partitions of the images is determined. Sample calculations based on dual frequency PMP sine wave patterns are illustrated in U.S. patent application Ser. No. 10/444,033, entitled, "System and Technique for Retrieving Depth Information about a Surface by Projecting a Composite Image of Modulated Light Patterns," by Laurence G. Hassebrook, Daniel L. Lau, and Chun Guan filed on May 21, 2003, which is incorporated by reference here. By processing the distortion shown using one or more of the above SLI techniques described above, the phase value at each pixel or point of the image, combined with identified world coordinates on the background pattern 310, is transformed to world coordinates of the hand surface. All the fields of view or needed partitions of fields of view are transformed in this manner into world coordinates sharing the same frame of reference.

In step 710, the overlapping partitions are merged using known world coordinates of the background pattern 310. Using the background pattern 310, the relative positions of the fingers, thumb and other part of the hand in the images is known with respect to the background pattern 310, and so partitions and images can be aligned based on the background pattern 310. Overlapping fields of view in a partition are analyzed for misalignment and are then corrected resulting in one continuous 3D surface representation of the hand or portions of the hand processed. Other methods, such as Iterative Closest Point algorithm may also be employed to merge the overlapping partitions. Any misalignments are corrected in step 712. For example, distortions such as barrel distortions or radial distortions may cause misalignment and must be compensated for to correct such misalignments. Once the partitions are stitched together, the 3D model of the handprint surface is completed. The 3D model includes the x,y,z coordinates at each pixel of the surface as well as the albedo value or average intensity information at each pixel.

In step 714, a smooth or average approximation of a handprint surface for each partition without ridges or other fine details is determined. By finding surface normal vectors for all the pixels in the average or smooth approximation of the handprint surface and comparing them with the 3D world coordinates (x,y,z) of a ridge, detailed handprint surface information can be extracted. The detailed handprint surface information includes the shape and height or depth of the ridges with respect to the average approximation of the handprint surfaces. Thus, the handprint ridge heights are determined when the detailed handprint surface information is extracted in each partition.

In step 716, the 3D model is unwrapped into a 2D flat surface. The smooth or average approximation of the handprint surface is mapped to a 2D rolled print data space. In this process, the average approximation of the handprint surface is warped to a flat 2D surface analogous to rolling an inked finger. In one embodiment of the invention to achieve the rolled equivalent, a rectangular mesh of nodal points connected with virtual springs is generated having a relaxation distance equal to the Euclidean distance between two points in the 3-D space. These nodal points in the rectangular mesh are taken from a set of all or less than all of the smooth or average approximated surface points obtained in step 714. These points are then projected on a 2-D surface and are allowed to iteratively expand thereby reducing the total energy built into each spring. The extracted handprint surface from step 714 is then warped onto the resulting nodal points, which can then be interpreted as the rolled equivalent of a handprint. The details of the processing in steps 714 and 716 are explained below with respect to FIG. 14.

In step 718, the ridge height information from the extracted handprint surface is translated into a grey scale, so that depths and heights of finger print ridges are represented in the image by the grey scale. The ridge height information or the difference vector values are mapped to a gray-scale image index value such as 8 or 16-bits per pixel. The 3D representation of the handprint is thus transformed into a 2D representation equivalent of a rolled inked handprint. The 2D rolled equivalent handprint images may be formatted or rendered into different file types or standards as specified by an application or industry standard, in step 720. For example, to meet certain industry standards, the 2D rolled equivalent handprint images must be properly compressed, demographic data included in the correct format. The formatting of the files for the 2D rolled equivalent handprint images ensures that the resulting files are constructed properly for interoperability with government agencies or other standard compliant vendors. Commercial development tools, such as Aware's NISTPACK too can be used to help generate such standard compliant fingerprint data files.

Figure 14A:
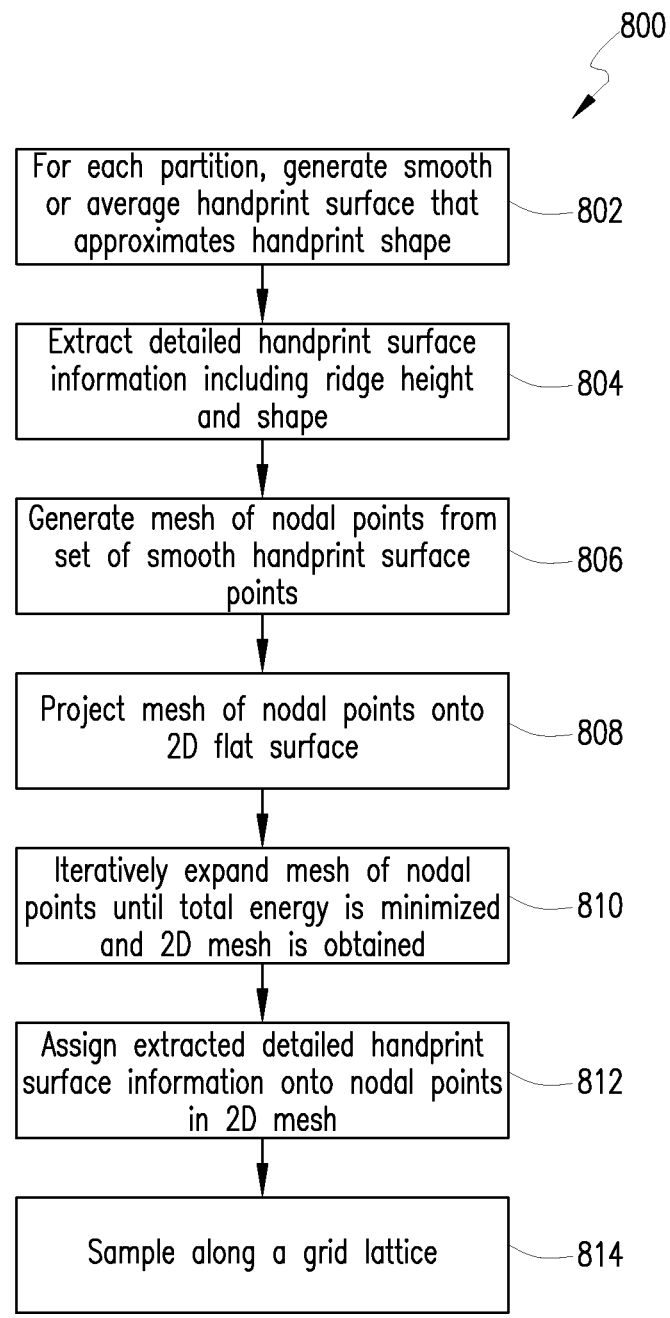
FIGS. 14a, 14b, 14c and 14d illustrate one embodiment of a method for image processing in the biometrics system of the present invention.

FIGS. 14a-d provide in more detail the processing steps 714 and 716 of FIG. 12. The method of creating a 2D rolled equivalent handprint in one embodiment of the biometrics system 100 is shown in FIG. 14a. The method in FIG. 14 is illustrated with respect to one fingertip partition, but a person of skill in the art would appreciate that the method may be applied to other partitions showing other parts of the handprint and/or to other biometric features.

Figure 14B:
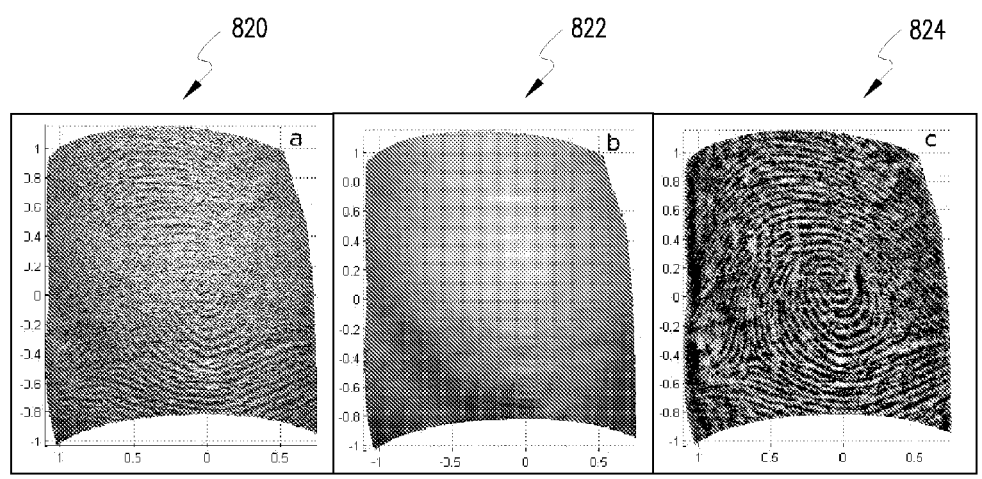

In the first step 802, a smooth fingerprint surface is extracted that approximates the fingerprint shape. Specifically, the surface extraction algorithm virtually peels the surface characteristics off the 3-D scan by smoothing the fingerprint ridges in the 3-D scans. The resulting smooth surface is a reconstructed manifold that closely approximates the finger's shape. Various algorithms have been proposed in the literature for smoothing and rendering 3-D point clouds but each has disadvantages, such as extended processing. In this embodiment of the biometrics system 100, the method 800 uses orthogonal regression planes to do the surface approximation. At each 3-D point in the dataset, a plane is fitted to a subset of points defined by a W×W sized kernel centered at that point. A weighted nonlinear, least-squares method is used to fit the plane, giving more weight to points near the point whose response is being estimated and less weight to points further away, i.e. if the local surface is given by S, then, $$S = \min_a \sum_{i=1}^{N} w_i \cdot (f(a, x_i, y_i z_i))^2,$$

Where $$f=a(1)x+a(2)y+a(3)z+a(4)$$

and wi is the weight of the ith residual. To achieve a non-linear fitting, iterative optimization procedures are applied to estimate the plane parameter values till convergence is achieved. The use of iterative procedures requires starting values to be provided for optimization. The starting values must be reasonably close to the unknown parameter estimates or the optimization procedure may not converge. A good approximation of these starting values is calculated using the Singular Value Decomposition (SVD) method. The centroid of the data and the smallest singular value, obtained from the SVD method, defines the initial plane that is used for the optimization process. The weights assigned to each point for determining its influence on the fitting are calculated using a Gaussian function, $$w_i e^{-dist_i^2/\sigma^2}$$

where disti is the Euclidean distance between the kernel center point and ith point of the kernel. The Euclidean distance is calculated between the orthogonal projections of the points onto the fitted plane. The advantage of using this technique is that the points get weighted according to their actual position on the fingerprint surface and not on the basis of their location in the scanner space. This helps extract the fingerprint surface from the 3-D scan with utmost fidelity and accuracy. The orthogonal projection is computed by calculating the point of intersection of the plane and the perpendicular line through the respective point to the plane. The variance, G, is a user-defined parameter that controls the degree of approximation or the amount of smoothing with the larger variance value leading to the smoother surface. FIG. 14b illustrates the original 3D surface scan 820, and the average or smooth approximated surface 822 obtained after smoothing with variance value $\sigma^2$ equal to 0.01. Lower values of the variance $\sigma^2$ will provide a surface that is less smooth and still has some detectable ridges while higher values may provide too much smoothness and lose some of the shape of the finger.

In step 802, after obtaining the smooth or average approximation to the fingerprint shape using the above algorithm, the fingerprint surface is extracted by subtracting the smooth or average approximated surface from the original 3D surface scan. The difference vector between the original 3-D scan and this smooth or average approximated surface gives the required fingerprint surface. The detailed fingerprint surface information is obtained by taking the magnitude of the difference vector, the sign of which depends on the sign of the difference vector in the Z direction. FIG. 14b shows an example of an extracted fingerprint surface 824 warped as the color component on the smoothened 3-D surface. The extracted handprint surface 824 is essentially the difference surface between the original 3-D scan and the smoothened model. The height or depth of the handprint ridges can be determined with respect to the smooth or average approximated surface. Thus, the detailed handprint surface information from the extracted handprint includes the handprint ridge heights in each partition.

In the next step 806, the 3D model is unwrapped into a 2D flat surface. The 3-D fingerprint surface needs to be flattened to get 2-D rolled equivalent fingerprint image. These images are generated by applying a springs algorithm. The springs algorithm establishes a mapping for converting the initial 3-D shape to a flattened 2-D shape, by applying a mass spring system to the 3-D point cloud. The basic idea used is to treat the point cloud as a mechanical system, in which points are replaced by a body with some mass and these bodies are connected to each other by springs. All the springs have a relaxed length and a current length. If the relaxed length is greater than the current length of the spring, then the spring is compressed between the two bodies and the two bodies need to move apart for the spring to reach its natural length. Similarly if the relaxed length is less than the current length of the spring, the spring is stretched and the two connecting bodies need to come closer for the spring to attain the relaxed length. The spring forces will attract or repulse the bodies until the system reaches minimum energy. This is called the balanced state.

For flattening, first a rectangular mesh of nodal points connected by springs is generated from a subset of the point cloud or 3D coordinates of the smooth or average approximated surface, as shown in FIG. 14a step 806. The virtual springs have a relaxation distance equal to the Euclidean distance between two points of the 3D space of the handprint images. In step 808, these points are then projected onto a 2D surface in step 810. In step 812, the points are allowed to iteratively expand thereby reducing the total energy built into each string. The energy stored in the virtual springs connecting a point in the mesh to the 8-connected neighbors has to be minimized. To minimize this energy, only the point whose displacement is being calculated moves and the remaining points remain fixed. The displacement of the point is iterative and every iteration consists of one pass over all the points in the mesh. To evaluate the total energy e at a point, the energy stored in each spring connecting the point to its neighbors is added together, $$e = \sum_{i=1}^{n} e_i$$

Figure 14C:
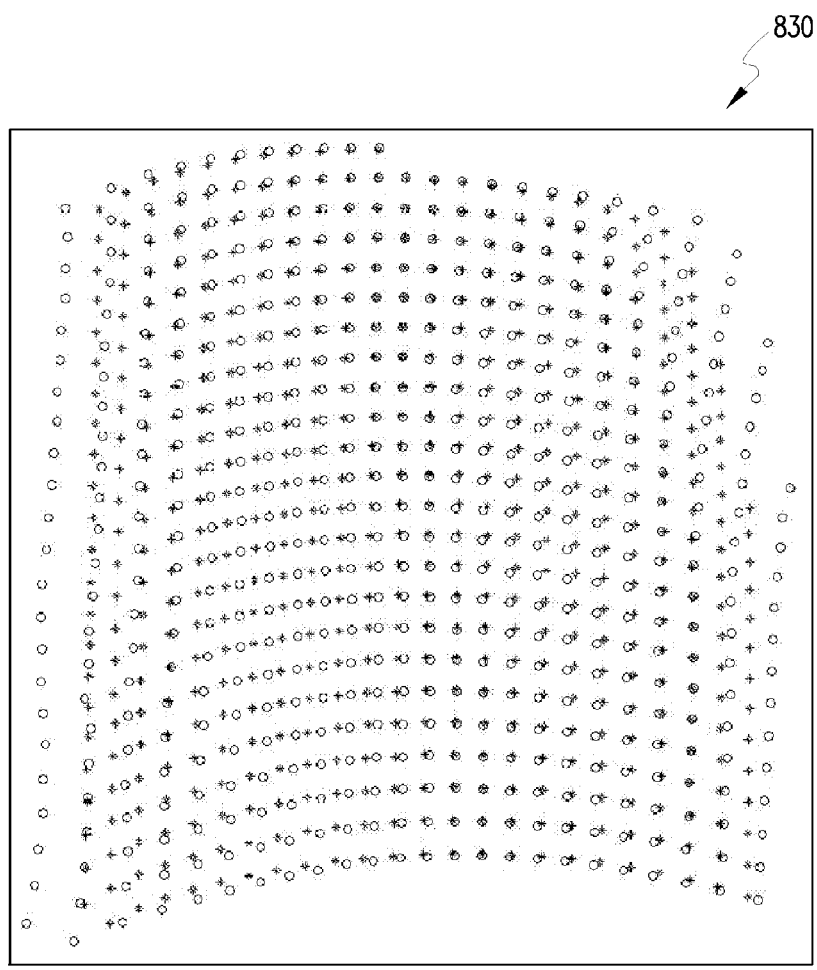

The individual energy $e_i$ is computed by squaring the magnitude of the displacement between the current length of the spring and its relaxed length. The sign of the displacement vector determines the type of force, attractive or repulsive that has to be applied to the spring in order to achieve the balanced state. The energy stored in the ith spring is hence determined by, $$e_i = \text{sign}(d_i - r_i) \cdot (d_i - r_i)^2$$

where, $d_i$ is the current length which is taken to be the Euclidean distance between the points in the 2-D space and $r_i$ is the relaxed length of the $i^{th}$ spring determined by the Euclidean distance between the points in the 3-D space. The energy in each spring is then assigned the direction of the displacement vector and added to the total energy e at the point under consideration. To attain the equilibrium state, the point has to move depending on the energy stored at that point. A percentage amount, $\lambda$, of the total energy is used to displace the mesh point in the 2-D space. The value of $\lambda$ must be chosen to prevent making the system unstable, e.g. large values of $\lambda$ can make the system unstable. FIG. 14c shows a simulation 830 of the algorithm in one-dimensional space in the X-Y plane. The points marked as stars (*) are the initial 2-D nodal mesh given as input to the springs algorithm. The points marked as blank circles (o), are positions of the same points after 1000 iterations of the Springs algorithm. As the number of iterations increase, the points move in the 2-D space to attain an equilibrium state. The balanced state is achieved when the distance between these points is equal to their Euclidean distance in the 3-D space.

Figure 14D:
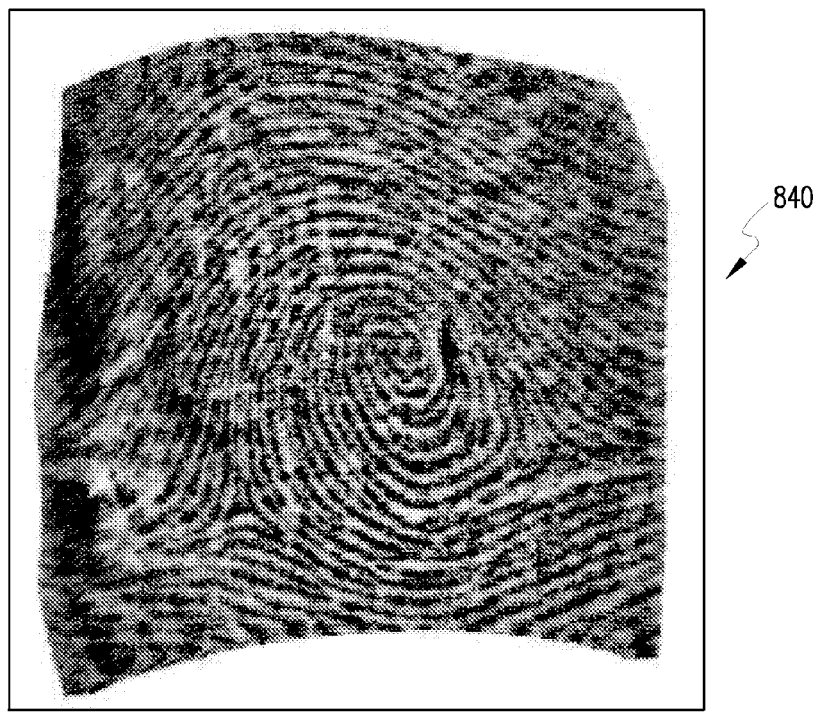

FIG. 14d illustrates the 2D rolled equivalent fingerprint 840 generated from the unraveled fingerprint surface, obtained by applying the springs algorithm to the fingerprint scan shown in FIG. 14b. The 2-D unraveled nodal points in FIG. 14d were obtained after 5,000 iterations. Since only a subset of the 3D coordinates of the original handprint scan were assigned as nodal points in the mesh, any of the other unassigned 3D coordinates may be assigned within the 2D mesh of unraveled nodal points.

In step 814, the extracted fingerprint surface, obtained from the extraction step 804, is warped as a color component onto the 2-D nodal mesh to generate the 2D rolled equivalent fingerprint in FIG. 14d. Each of the points in the 2D mesh of unraveled nodal points are assigned a ridge height information from the fingerprint surface extracted in step 802. Any other detailed fingerprint surface information extracted in step 802 can be warped around as the color component as well. To obtain points or pixels at regular intervals, the resulting 2D unraveled mesh of nodal points with detailed handprint surface information may be sampled along a grid lattice to create the 2-D rolled equivalent image. Histogram manipulation may also be applied to match the fingerprint histograms of existing, high quality scans within a target database. This histogram manipulation may be done during the processing to aid in further processing or at the end of the processing to match the fingerprint with an identity.

The embodiments of the biometrics system 100 described herein have various advantages over the prior art. For example, speed of acquisition of the handprint images is greatly increased from the 5-10 minutes of rolled ink fingerprinting. Translucent sweat or oil will not corrupt the handprint images nor will common variations in skin color. The biometrics system 100 is robust to translucent materials and resistant to specularity of shiny surfaces. The biometrics system 100 is more robust to extremely worn ridges of the fingers and palm.

Though the present embodiment has been described for obtaining a hand print, a person of skill in the art would appreciate that the system may be modified for obtaining images for other biometrics, such as scars, tattoos, facial features, etc. The present system may also be used in other fields besides biometrics. For example, in medical fields, the present invention may be used for measuring moles on skin surfaces or other features that need to be recorded, measured or monitored. Other uses include Human Computer Interaction, prosthetic development, industrial inspection, special effects and others.

While certain representative embodiments have been described herein, a person of skill in the art would appreciate that various substitutions, modifications or configurations other than those described herein may be used and are within the scope of the claims of the present invention.

What is claimed is:

1. A method for a processing device to determine a two dimensional (2D) handprint image from a three dimensional (3D) data of the handprint, comprising:

processing one or more handprint images captured with a structured light illumination technique to determine 3D coordinates in the one or more handprint images;

extracting by the processing device handprint surface information using the 3D coordinates, wherein the handprint surface information includes ridge height information;

generating a 2D handprint image from a set of the 3D coordinates;

mapping by the processing device the handprint surface information onto the 2D handprint image; and translating the ridge height information to a grey-scale image index.

2. The method of claim 1, wherein extracting by the processing device handprint surface information using the 3D coordinates of the handprint comprises:

generating a smooth handprint surface that approximates a shape of the handprint;

determining surface normal vectors at a plurality of points in the smooth handprint surface; and comparing the surface normal vectors at the plurality of points in the smooth handprint surface with the 3D coordinates in the one or more handprint images to determine the handprint surface information at the plurality of points.

3. The method of claim 2, further comprising:

calculating a magnitude of a difference vector between the 3D coordinates of one of the plurality of points in the one or more handprint images and a corresponding point in the smooth handprint surface to determine the ridge height information.

4. The method of claim 1, wherein generating the 2D handprint image from the set of the 3D coordinates, comprises:

generating by the processing device a mesh of nodal points from the set of the 3D coordinates, wherein the mesh of nodal points are modeled as connected by springs;

projecting by the processing device the mesh of nodal points onto a 2D plane; and iteratively allowing the nodal points to move in the 2D plane such that the total energy stored in the springs connecting the nodal points is minimized to generate the 2D handprint image.

5. A processing device for generating a two dimensional (2D) print image from three-dimensional (3D) data, comprising:
at least one processor operable to:
determine 3D coordinates of a print;
generate 3D coordinates of a smooth print surface that approximates a shape of the print;
extract print surface information by comparing a set of the 3D coordinates of the smooth print surface with the 3D coordinates of the print, wherein the print surface information includes ridge height information;
generate a 2D print image from the set of the 3D coordinates of the smooth print surface;
map the print surface information onto the 2D print image; and
translate the ridge height information to a grey-scale in the 2D print image.

6. The processing device of claim 5, wherein the processor is operable to generate the 2D print image from the set of 3D coordinates of the smooth print surface by:
generating a mesh of nodal points from the set of the 3D coordinates of the smooth print surface;
projecting the mesh of nodal points with 3D coordinates onto a 2D plane; and
assigning the print surface information to nodal points in the mesh of nodal points projected onto the 2D plane.

7. The processing device of claim 5, wherein the mesh of nodal points are modeled as connected by springs with a relaxation variable between the nodal points.

8. The processing device of claim 7, wherein the processer is further operable to:
iteratively move the nodal points in the mesh of nodal onto the 2D plane to lower the relaxation variable in the springs connecting the nodal points to project the 3D coordinates of the mesh of nodal points onto the 2D plane.

9. The processing device of claim 8, wherein the processor is further operable to:
map 3D coordinates of the smooth handprint surface not assigned to the mesh of nodal points to the 2D plane.

10. The processing device of claim 8, wherein the processor is further operable to:
resample the nodal points in the mesh of nodal points projected onto the 2D plane with print surface information along a grid lattice.

11. The processing device of claim 5, wherein the set of the 3D coordinates of the smooth print surface is less than all the 3D coordinates of the smooth print surface.

12. The processing device of claim 5, wherein the processor is operable to extract print surface information by comparing a set of the 3D coordinates of the smooth print surface with the 3D coordinates of the print by:
calculating a magnitude of a difference vector between the 3D coordinates of a point in the print with a corresponding point in the smooth print surface to determine ridge height information.

13. A method for a processing device to generate a two dimensional (2D) print image from three-dimensional (3D) data, comprising:
determining 3D coordinates of a print;
generating 3D coordinates of a smooth print surface that approximates a shape of the print;
extracting print surface information by comparing a set of the 3D coordinates of the smooth print surface with the 3D coordinates of the print, wherein the print surface information includes ridge height information;
generating a 2D print image from the set of the 3D coordinates of the smooth print surface;
mapping the print surface information onto the 2D print image; and
translating the ridge height information to a grey-scale in the 3D print image.

14. The method of claim 13, wherein generating the 2D print image from the set of 3D coordinates of the smooth print surface includes:
generating a mesh of nodal points from the set of the 3D coordinates of the smooth print surface;
projecting the mesh of nodal points with 3D coordinates onto a 2D plane; and
assigning the print surface information to nodal points in the mesh of nodal points projected onto the 2D plane.

15. The method of claim 14, wherein the set of the 3D coordinates of the smooth print surface is less than all the 3D coordinates of the smooth print surface.

16. The processing device of claim 13, wherein extracting print surface information by comparing a set of the 3D coordinates of the smooth print surface with the 3D coordinates of the print includes:
calculating a magnitude of a difference vector between the 3D coordinates of a point in the print with a corresponding point in the smooth print surface to determine ridge height information.

17. A processing device operable to determine a two dimensional (2D) handprint image from a three dimensional (3D) data of the handprint, comprising:
at least one processor operable to:
process one or more handprint images captured with a structured light illumination technique to determine 3D coordinates in the one or more handprint images;
extract ridge height information using the 3D coordinates;
generate a 2D handprint image from a set of the 3D coordinates, wherein the 2D handprint image includes a mapping of the ridge height information onto the 2D handprint image using a grey-scale index.

18. The processing device of claim 17, wherein the at least one processor is operable to extract handprint surface information using the 3D coordinates of the handprint by:
generating a smooth handprint surface that approximates a shape of the handprint;
determining surface normal vectors at a plurality of points in the smooth handprint surface; and
comparing the surface normal vectors at the plurality of points in the smooth handprint surface with the 3D coordinates in the one or more handprint images to determine the handprint surface information at the plurality of points.

19. The processing device of claim 18, wherein the at least one processor is further operable to:
calculate a magnitude of a difference vector between the 3D coordinates of one of the plurality of points in the one or more handprint images and a corresponding point in the smooth handprint surface to determine the ridge height information.

20. The processing device of claim 17, wherein the at least one processor is operable to generate the 2D handprint image from the set of the 3D coordinates by:
generating a mesh of nodal points from the set of the 3D coordinates;
projecting the mesh of nodal points onto a 2D plane.

* * * * *